US011275177B2

(12) United States Patent
Koyama et al.

(10) Patent No.: US 11,275,177 B2
(45) Date of Patent: Mar. 15, 2022

(54) DISTANCE MEASUREMENT APPARATUS AND VEHICLE

(71) Applicant: SONY CORPORATION, Tokyo (JP)

(72) Inventors: Takahiro Koyama, Kanagawa (JP); Tomoki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/489,619

(22) PCT Filed: Dec. 27, 2017

(86) PCT No.: PCT/JP2017/046916
§ 371 (c)(1),
(2) Date: Aug. 28, 2019

(87) PCT Pub. No.: WO2018/179650
PCT Pub. Date: Oct. 4, 2018

(65) Prior Publication Data
US 2020/0011998 A1 Jan. 9, 2020

(30) Foreign Application Priority Data

Mar. 31, 2017 (JP) .............................. JP2017-071712

(51) Int. Cl.
*G01S 17/931* (2020.01)
*G01C 22/00* (2006.01)
*G01S 7/481* (2006.01)
*G01S 17/10* (2020.01)
*G02B 26/10* (2006.01)

(52) U.S. Cl.
CPC ............ *G01S 17/931* (2020.01); *G01C 22/00* (2013.01); *G01S 7/481* (2013.01); *G01S 17/10* (2013.01); *G02B 26/10* (2013.01)

(58) Field of Classification Search
CPC ........ G01S 17/10; G01S 17/931; G01S 7/481; G01C 22/00; G02B 26/10
See application file for complete search history.

(56) References Cited

U.S. PATENT DOCUMENTS 4,425,041 A * 1/1984 Nishiyama ........... G01B 11/306
356/613
6,369,928 B1 * 4/2002 Mandella ........... G02B 21/0032
359/204.1
(Continued)

FOREIGN PATENT DOCUMENTS

CN 104871029 A 8/2015
DE 102011113147 B3 * 9/2011 ............. G01S 17/89
(Continued)

OTHER PUBLICATIONS

International Search Report and Written Opinion of PCT Application No. PCT/JP2017/046916, dated Mar. 20, 2018, 10 pages of ISRWO.

*Primary Examiner* — Quan-Zhen Wang
*Assistant Examiner* — Mancil Littlejohn, Jr.
(74) *Attorney, Agent, or Firm* — Chip Law Group

(57) ABSTRACT

Provided is a distance measurement apparatus including a light projector that projects reference pulsed light to an object region, a light receiver that receives reflected pulsed light from the object region, and a scanning unit including a plurality of movable mirrors provided between the light projector and the object region and synchronously operated. The distance measurement apparatus further includes a calculation unit that calculates a distance to the object region on the basis of a difference between light projection timing of projecting the reference pulsed light and light receiving timing of receiving the reflected pulsed light.

11 Claims, 14 Drawing Sheets

(56) References Cited

U.S. PATENT DOCUMENTS

| | | | |
|---|---|---|---|
| 6,650,403 B2 * | 11/2003 | Ogawa | G01S 17/14 356/5.01 |
| 7,768,629 B2 * | 8/2010 | Typpo | G01B 11/0691 356/4.01 |
| 9,874,635 B1 * | 1/2018 | Eichenholz | G01S 7/4814 |
| 2005/0248818 A1 * | 11/2005 | Ouchi | G02B 27/0172 359/15 |
| 2006/0238741 A1 * | 10/2006 | Ninomiya | G01J 3/36 356/5.01 |
| 2008/0002986 A1 * | 1/2008 | Izumi | H04B 10/1121 398/158 |
| 2013/0027711 A1 * | 1/2013 | Hajian | G01B 9/02091 356/451 |
| 2015/0301182 A1 | 10/2015 | Geiger et al. | |

FOREIGN PATENT DOCUMENTS

| | | | | |
|---|---|---|---|---|
| DE | 102011113147 B3 * | 1/2013 | | G01S 7/4817 |
| DE | 102011113147 B3 | 1/2013 | | |
| DE | 102012025281 A1 | 6/2014 | | |
| EP | 2708914 A1 | 3/2014 | | |
| EP | 2936193 A1 | 10/2015 | | |
| JP | 2010-151618 A | 7/2010 | | |
| JP | 2014-059301 A | 4/2014 | | |
| WO | 2014/095105 A1 | 6/2014 | | |
| WO | 2017/037968 A1 | 3/2017 | | |
| WO | WO-2017037968 A1 * | 3/2017 | | G01S 17/10 |

\* cited by examiner

DISTANCE MEASUREMENT APPARATUS AND VEHICLE

CROSS REFERENCE TO RELATED APPLICATIONS

This application is a U.S. National Phase of International Patent Application No. PCT/JP2017/046916 filed on Dec. 27, 2017, which claims priority benefit of Japanese Patent Application No. JP 2017-071712 filed in the Japan Patent Office on Mar. 31, 2017. Each of the above-referenced applications is hereby incorporated herein by reference in its entirety.

TECHNICAL FIELD

The present disclosure relates to a distance measurement apparatus and a vehicle.

BACKGROUND ART

There is a proposed distance measurement apparatus that measures a distance to a measurement object by irradiating the measurement object with light pulses and measuring a time until reflection light thereof returns (for example, see Patent Document 1).

CITATION LIST

Patent Document

Patent Document 1: Japanese Patent Application Laid-Open No. 2010-151618

SUMMARY OF THE INVENTION

Problems to be Solved by the Invention

In a field of such a distance measurement apparatus, it is desirable that spatial distance information having high accuracy and high resolution can be acquired.

Therefore, an object of the present disclosure is to provide: a distance measurement apparatus that can acquire the spatial distance information having high accuracy and high resolution; and a vehicle to which the distance measurement apparatus is applied.

Solutions to Problems

The present disclosure is, for example,
a distance measurement apparatus including:
a light projector that projects reference pulsed light to an object region;
a light receiver that receives reflected pulsed light from the object region;
a scanning unit including a plurality of movable mirrors provided between the light projector and the object region and synchronously operated; and
a calculation unit that calculates a distance to the object region on the basis of a difference between light projection timing of projecting the reference pulsed light and light receiving timing of receiving the reflected pulsed light.

Furthermore, the present disclosure may also be a vehicle including the above-described distance measurement apparatus.

Effects of the Invention

According to at least an embodiment of the present disclosure, spatial distance information having high accuracy and high resolution can be acquired. Note that the effect recited herein is not necessarily limited and may be any effect recited in the present disclosure. Furthermore, the content of the present disclosure should not be understood in a manner limited by the exemplified effects.

MODE FOR CARRYING OUT THE INVENTION

Figure 1:
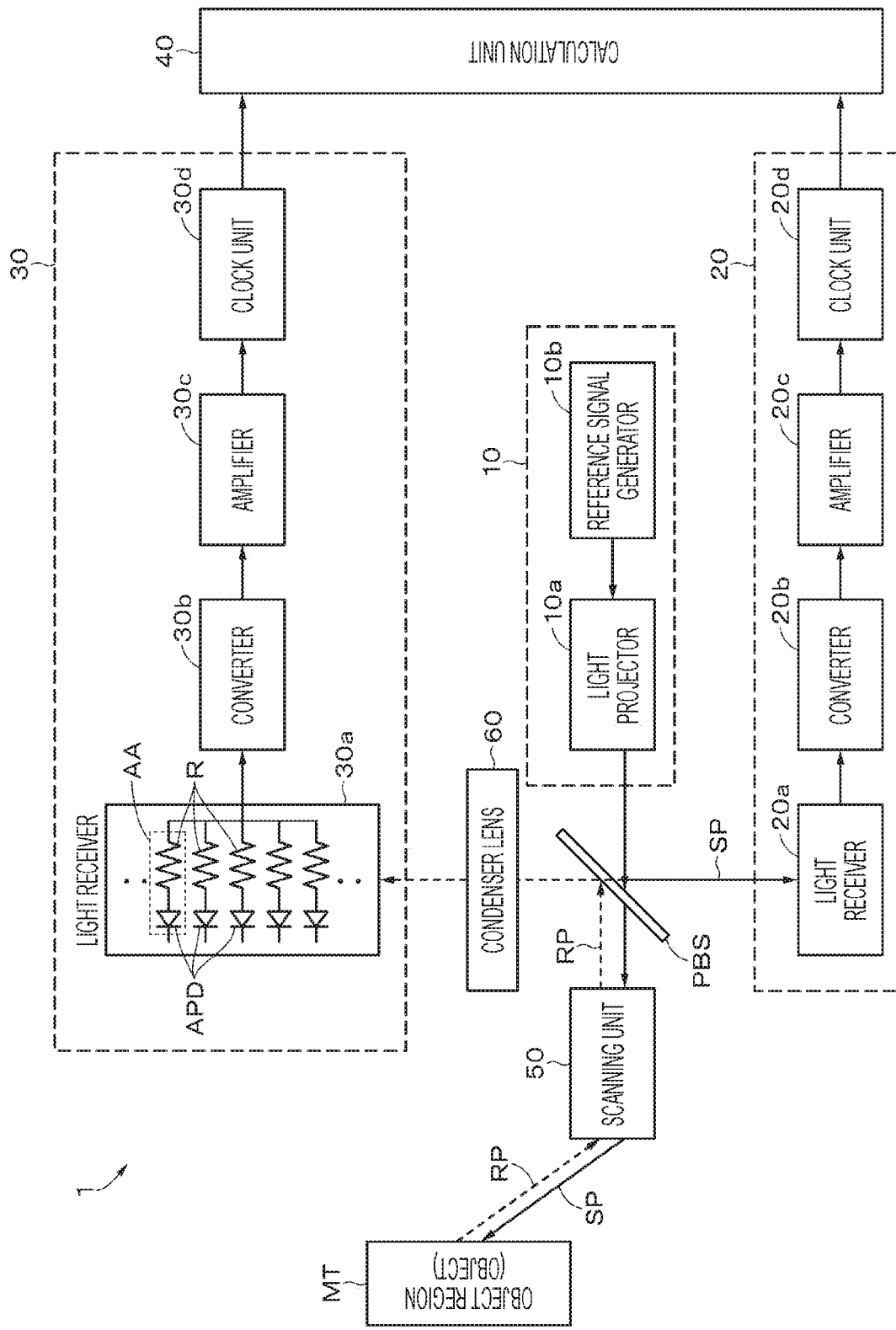
FIG. 1 is a block diagram to describe an exemplary configuration of a distance measurement apparatus according to a first embodiment.

In the following, embodiments and the like of the present disclosure will be described referring to the drawings. Note that the description will be provided in the following order.
<1. First Embodiment>
<2. Second Embodiment>
<3. Third Embodiment>
<4. Modified Examples>
<5. Exemplary Application>
Note that the embodiments and the like described below are preferred specific examples of the present disclosure and the content of the present disclosure is not limited to the embodiment and the like.

1. First Embodiment

[Regarding Exemplary Configuration of Distance Measurement Apparatus]
FIG. 1 is a block diagram illustrating an exemplary configuration of a distance measurement apparatus (distance measurement apparatus 1) according to a first embodiment of the present disclosure. The distance measurement apparatus 1 includes, for example, a light projection unit 10, a first measurement unit 20, a second measurement unit 30, a calculation unit 40, a scanning unit 50, a condenser lens 60, and a polarizing beam splitter PBS.

Schematically describing, the distance measurement apparatus 1 is a device that has the following distance measuring functions. The distance measurement apparatus 1 according to the present embodiment irradiates an object region while continuously changing, by the scanning unit 50, a direction of reference pulsed light SP emitted from the light projection unit 10 and receives, by the scanning unit 50 again, reflected pulsed light RP from an object MT located in the object region in an optical axis same as the irradiation direction with the reference pulsed light SP. While the reflected pulsed light RP is received by the second measurement unit 30 at predetermined light receiving timing, light projection timing of the reference pulsed light SP is measured by the first measurement unit 20. A time of flight T_TOF of the pulsed light is obtained from a difference between these two kinds of timing. Then, the calculation unit 40 multiplies the time of flight T_TOF by a light speed and ½, thereby measuring a distance to the object MT. In the following, details of the distance measurement apparatus 1 will be described.

The light projection unit 10 includes, for example, a light projector 10a and a reference signal generator 10b. The light projector 10a includes, for example, a semiconductor laser and a laser diode driver that drives the semiconductor laser. The pulsed light is emitted from the semiconductor laser by intermittently injecting pulsed current from the laser diode driver. As an example, the pulsed light having a wavelength of about 800 nanometers (nm) and a half-value width of 100 picoseconds (ps) or less is emitted from the light projector 10a with repetition of 20 megahertz (MHz). It is preferable that the wavelength of the pulsed light be a wavelength included in a small proportion in the sunlight that is to be disturbance light, but pulsed light having a wavelength different from the above-mentioned example may also be adopted. Furthermore, it is desirable that the half-value width of the pulsed light be set shorter than a rising time of a signal output from a light receiver included in each of the first and second measurement units 20 and 30. The reference signal generator 10b manages the timing at which the laser diode driver included in the light projector 10a injects the current.

The first measurement unit 20 includes, for example, a light receiver 20a, a converter 20b, an amplifier 20c, and a clock unit 20d. The light receiver 20a includes, for example, a plurality of photon count type light receiving elements connected in parallel. In the present embodiment, a single photon avalanche photodiode (hereinafter referred to as a single photon avalanche diode (SPAD) as appropriate) is used as the photon count type light receiving element. Note that details of the light receiver 20a will be described later.

The converter 20b is an element or a circuit that converts, into voltage, current output from the light receiver 20a. The converter 20b in the present embodiment includes a resistor connected between the light receiver 20a and a ground (GND).

The amplifier 20c is a circuit that amplifies the voltage output from the converter 20b at a predetermined amplification factor. As the amplifier 20c, for example, a limiting amplifier that outputs a limit value can be applied in a case where the voltage after the amplification exceeds a predetermined limit value.

The clock unit 20d measures light projection timing ta of the reference pulsed light SP by detecting an edge point at which the voltage output from the amplifier 20c reaches a predetermined threshold, and outputs the measured light projection timing ta to the calculation unit 40. As the clock unit 20d, for example, a time-digital converter (hereinafter referred to as time digital converter (TDC) as appropriate) that converts the measured timing into a digital value and outputs the digital value. Besides the TDC, for example, a constant fraction discriminator (CFD) or the like may be used as the clock unit 20d, and the CFD detects a zero-cross point by adding an attenuation waveform of a predetermined waveform to a waveform obtained by delaying and inverting the predetermined waveform.

The second measurement unit 30 includes, for example, a light receiver 30a, a converter 30b, an amplifier 30c, and a clock unit 30d. The light receiver 30a includes, for example, a plurality of photon count type light receiving elements connected in parallel. In the present embodiment, the SPAD is used as the photon count type light receiving element. Note that details of the light receiver 30a will be described later.

The converter 30b is an element or a circuit that converts, into voltage, current output from the light receiver 30a. The converter 30b in the present embodiment includes a resistor connected between the light receiver 30a and the ground (GND).

The amplifier 30c is a circuit that amplifies the voltage output from the converter 30b at a predetermined amplification factor. As the amplifier 30c, for example, a limiting amplifier that outputs a limit value can be applied in a case where the voltage after the amplification exceeds a predetermined limit value.

The clock unit 30d measures light receiving timing tb of the reflected pulsed light RP by detecting an edge point at which the voltage output from the amplifier 30c reaches a predetermined threshold, and outputs the measured light receiving timing tb to the calculation unit 40. As the clock unit 30d, for example, a TDC that converts the measured timing into a digital value and outputs the digital value can be applied. Besides the TDC, a CFD or the like may also be used as the clock unit 30d.

The calculation unit 40 includes a microcomputer, a field programmable gate array (FPGA), and the like. The calculation unit 40 obtains a time of flight T_TOF of the pulsed light from a difference between the light projection timing to and the light receiving timing tb. Then, a distance to the object MT is measured by multiplying the time of flight T_TOF by a light speed and ½. The calculation unit 40 outputs the measured distance information up to the object MT. The distance information is used for processing in accordance with an application.

The scanning unit 50 performs scanning in a direction of the reference pulsed light SP and a direction of the reflected pulsed light RP. Note that details of the scanning unit 50 will be described later.

The condenser lens 60 is a lens to condense the reflected pulsed light RP having an optical path changed by the polarizing beam splitter PBS.

[Regarding Light Receiver]

Next, the light receiver 30a will be described in detail. In the present embodiment, since the configurations of the light receiver 20a and the light receiver 30a are the same, the following description is also applicable to the light receiver 20a. As illustrated in FIG. 1, the light receiver 30a includes an avalanche photodiode APD (hereinafter, also referred to as an APD as appropriate) and a quenching resistor R connected in series to the APD. In other words, the light receiver 30a has a configuration in which one light receiving element AA is a basic unit, and a plurality of light receiving elements AA is two-dimensionally and electrically connected (for example, connected in parallel). The light receiving element AA corresponds to the SPAD.

The APD in the SPAD causes avalanche multiplication at the time of receiving a single photon, and generates avalanche current at a multiplication factor of $10^5$ to $10^6$. The avalanche multiplication can be stopped by decreasing voltage applied to the APD to breakdown voltage or less. This function is implemented by the quenching resistor R. In other words, when the avalanche current flows through the quenching resistor R, voltage is generated at both ends of the quenching resistor R, thereby decreasing the voltage applied to the APD and stopping the avalanche multiplication. Due to the above-described mechanism, a SPAD signal (output signal of the single SPAD) becomes an exponentially-reduced current pulse.

The APD does not respond to another photon during the avalanche multiplication, namely, a predetermined period. A dead term is generally several ns (nanoseconds). In other words, the photon count type light receiving element represents, for example, an element that includes an element (such as the APD) that does not respond to another photon even when another photon is received during the predetermined period after having received the single photon, and can determine that one photon is received by checking the output.

By the way, as a noise signal generated from the SPAD, a dark count and an afterpulse can be exemplified. The dark count is a pulse signal generated by a thermally excited carrier, and the afterpulse is a pulse signal generated when a carrier is caught by a crystal defect or the like in the process of the avalanche multiplication and the carrier is released.

In a case where the light receiver 30a includes a single SAPD, it is difficult to distinguish between the above-described noise signal and the reflected pulsed light RP (may also be the reference pulsed light SP), and a high signal to noise (S/N) cannot be obtained. Accordingly, in the present embodiment, the light receiver 30a has a multi-pixel configuration in which a plurality of SPADs is connected in parallel. With this configuration, photons corresponding to the number of SPADs connected in parallel can be received at the same time and SPAD signals output from the respective SPADs are output in a superimposed manner, and therefore, it is possible to distinguish between the SPAD signals and a noise signal that may be generated accidentally. Furthermore, a high S/N signal can be obtained, and weak reflected pulsed light RP can also be received.

Figure 2:
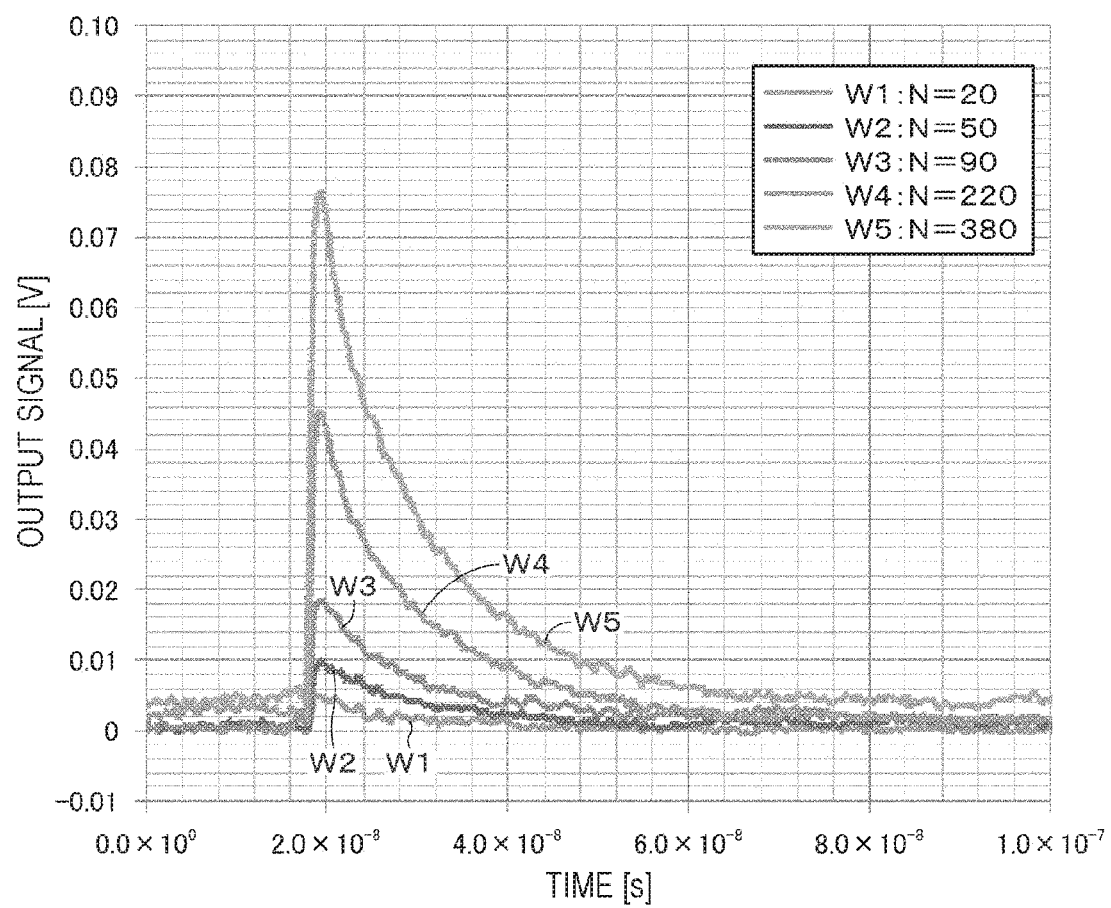
FIG. 2 is a diagram illustrating exemplary waveforms of output signals of SPADs.

FIG. 2 illustrates exemplary waveforms of voltage signals (output signals) obtained by making current signals output from the light receiver 30a pass through the converter 30b. Note that each current signal output from the light receiver 30a combines current signals output from the respective SPADs.

In FIG. 2, a vertical axis represents a voltage value, and a horizontal axis represents time. Note that the present example uses, as the light receiver 30a, the one in which one hundred twenty SPADs are vertically arranged, one hundred twenty SPADs are horizontally arranged, and these SPADs are connected in parallel (in which an interval between the SPADs (pitch interval) is 25 micrometers (μm)). A dynamic range of receivable reflected pulsed light corresponds to the maximum number of SPADs, and since fourteen thousand four hundred SPADs are connected in parallel in the present example, one to fourteen thousand four hundred photons can be received, and the dynamic rage is four digits or more.

In FIG. 2, a waveform W1 illustrates a waveform of an output signal when the light receiver 30a receives twenty photons, a waveform W2 illustrates a waveform of an output signal when the light receiver 30a receives fifty photons, a waveform W3 illustrates a waveform of an output signal when the light receiver 30a receives ninety photons, a waveform W4 illustrates a waveform of an output signal when the light receiver 30a receives two hundred twenty photons, and a waveform W5 illustrates a waveform of an output signal when the light receiver 30a receives three hundred eighty photons.

In general, in the case of using the plurality of SPADs, it is conceivable that the timing at which each of the SPADs receives a photon is varied, and the output signal is separated into a plurality of signals. However, when the half-value width of the pulsed light emitted from the light projector 10a is made shorter than a rising time of each of the SPAD signals, the output signal is prevented from becoming the separated signals and can be handled as a waveform that exponentially attenuates similar to a SPAD signal that is output from one SPAD as illustrated in FIG. 2.

The rising time of the output signal of the light receiver 30a is about 1 ns, a falling time (a time in which a signal level becomes 1/e (e is a logarithm)) is about 20 ns, and no waveform change can be observed in the output signal due to the increase in the number of the received SPADs. A peak level of the output signal becomes higher in accordance with the increase in the number of received photons, and a signal level per photon is about 0.2 millivolts (mV). No significant amplification can be observed in a noise level, and it is possible to obtain an output signal in which the S/N is improved by the increase in the number of received photons.

Simultaneous reception of a large number of photons by the plurality of SPADs can not only improve the S/N but also reduce variations in a light reception time (hereinafter referred to as SPAD jitter as appropriate) caused by the SPADs. This point will be described in detail.

When a sample having a size N is extracted from a population including mean values m and standard deviations σ in a case of assuming the population of normal distribution, an average value m' and a standard deviation σ' can be obtained from m'=m and σ'=σ/√N respectively. Here, when a jitter specific to the SPAD is defined as σ_SPAD, an effective SPAD jitter at the time of simultaneously receiving N photons can be obtained from σ_SPAD/√N, and the more increased the number N of the photons is, the more the effective SPAD jitter can be reduced. In other words, the SPAD jitter can be suppressed within a range of a statistical error by increasing the number N of the photons received by using the plurality of SPADs. That is, the SPAD jitter at the time of receiving the light by using the plurality of SPADs can be reduced more than the SPAD jitter at the time of receiving the light by using an individual SPAD. Thus, since the light receiver 30a includes the plurality of SPADs, it is possible to reduce the jitter in the light receiver 30a, and it is possible to prevent deterioration in distance measurement accuracy caused by an influence of the jitter.

As illustrated in FIG. 2, a convergence time during which the output signal from the light receiver 30a is converged is 60 ns to 80 ns, and can also cope with a repetition frequency 10 MHz of the pulsed light from the light projector 10a (100 ns in the view of a period). The convergence time is determined by a time constant or the like of the circuit including the SPADs, and mainly depends on total parasitic capacitance of the plurality of SPADs constituting the light receiver 30a. The convergence time can be shortened by narrowing the pitch interval between SPADs or by reducing the number of SPADs, and it is possible to cope with distance measurement that is repeated at a higher speed. In other words, the number of SPADs, an array form thereof, and the like are not limited to the one exemplified and can be arbitrarily set considering use of the distance measurement apparatus 1, intensity of the reflected pulsed light RP, and the like.

"Regarding Scanning Unit"

The distance measurement apparatus 1 in the present embodiment can acquire distance information in a one dimension, a two-dimensional plane, or a three-dimensional plane, not limited to a distance information in one direction (zero dimension), by performing distance measurement while performing scanning in one dimension or two dimension by the scanning unit 50 with the reference pulsed light SP.

As the scanning unit 50, a rotary mirror such as a galvano mirror or a polygon mirror can be used, but the distance measurement apparatus 1 according to the present embodiment uses a micro electro mechanical systems (MEMS) mirror which has advantages, such as being capable of downsizing and performing high-speed driving, and is manufactured by using semiconductor silicon. The MEMS mirror includes, for example: a mirror chip including a mirror, a coil, and a torsion bar; and a magnet. The mirror chip is formed by thinning a part of a silicon substrate, and generally an electromagnetic mirror has a configuration in which the magnet is arranged around the mirror chip.

The mirror is supported by a beam called the torsion bar, and the torsion bar functions as a rotary axis of the mirror and also as a torsion spring that suppresses rotation of the mirror. When current is made to flow through the coil around the mirror, Lorentz force is generated, and the Lorentz force becomes torque that rotates the mirror while elastic force of the torsion spring by the torsion bar acts in the opposite direction. The torque can be controlled by changing magnitude of the current flowing through the coil, an angle of the mirror can be changed. At this time, the MEMS mirror resonates at a natural vibration frequency determined by mass, a structure, and a spring constant, and utilizing such resonation, a large swing angle of the mirror can be achieved, and high-speed operation can be performed with the small current. The above-described MEMS mirror is a description relating to an electromagnetic driving method, but besides this method, there are an electrostatic method, a piezoelectric method, and the like, and MEMS mirrors of these driving methods can also be used as the scanning unit 50. Additionally, a MEMS mirror using a metal besides the semiconductor silicon can also be used as the scanning unit 50.

A view angle of the distance information that can be acquired by the distance measurement apparatus 1 is determined by a swing angle ($\theta$opt) of the MEMS mirror, and a MEMS mirror having the large $\theta$opt is required in order to obtain distance information having a large view angle. Furthermore, a scanning frequency coincides with a resonant frequency (f) of the MEMS mirror, and the MEMS mirror is required to have a high frequency in order to achieve high-frequency scanning. Here, assuming that a diameter in a rotary axis direction of the MEMS mirror is defined as D, it is reported that D*$\theta$opt*f exhibits a performance value corresponding to a certain constant performance curve, and when eopt and f are increased, D is inevitably reduced.

The accuracy of a distance measured by the distance measurement apparatus 1 depends on: a pulse width of the projected reference pulsed light SP; electric jitter of a device constituting the apparatus; and an S/N ratio of a signal. To improve the S/N ratio, it is advisable to increase intensity (S) of the reflected pulsed light and decrease intensity of a noise signal. In the distance measurement apparatus 1 that also receives the reflected pulsed light RP by the same optical axis via the MEMS mirrors as well as the reference pulsed light SP, it is possible to achieve reception at a high reflected light level (S) and suppress a noise level to a minimum noise level (N) by concentrating, into one measurement point, a projecting direction of the reference pulsed light SP and a visual field of the light receiver 30a. Here, to achieve a higher level of the reflected light, that is, to receive a more amount of the reflected pulsed light RP for the purpose of highly-accurate distance measurement, it is suggested to increase an aperture diameter, namely, the diameter D of the MEMS mirror.

However, when D is increased as described above, there is a problem that $\theta$opt or f is reduced. To avoid such a trade-off relation, the diameter D of the MEMS mirror is effectively increased by arranging a plurality of MEMS mirrors in the embodiment of the present disclosure. Assuming that the number of MEMS mirrors to be used is defined as (N), the aperture becomes N times, and therefore, it is possible to obtain an effect similar to in a case of increasing the diameter D of the MEMS mirror N times and there is no change in the diameter D of each of the MEMS mirrors. Therefore, both eopt and f can be kept at original standards.

Figure 3:
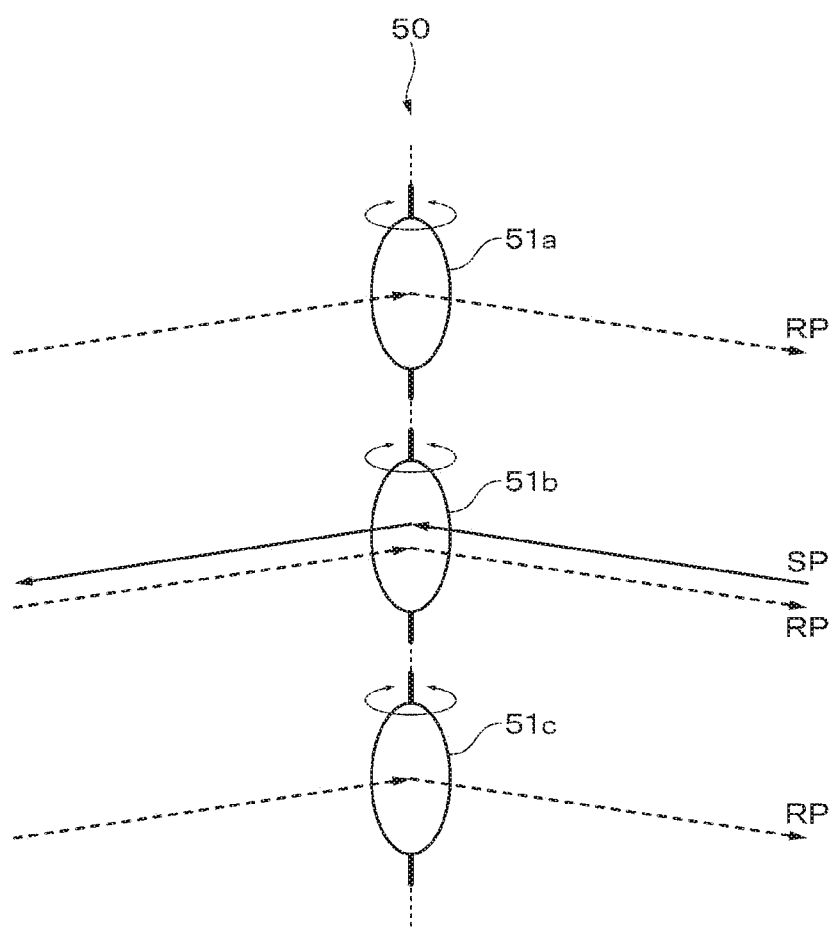
FIG. 3 is a diagram to describe an exemplary configuration of a scanning unit according to the embodiment.

FIG. 3 is a diagram illustrating an exemplary configuration of the scanning unit 50. The scanning unit 50 includes, for example, three MEMS mirrors 51a, 51b, and 51c. Note that, in the following description, when there is no need to distinguish the individual MEMS mirrors, each of the MEMS mirrors will be referred to as a MEMS mirror 51. As a material of each MEMS mirror 51, a metal such as silicon (Si) can be exemplified as described above.

The MEMS mirrors 51 each have the same shapes such as a round or an oval and have the same size. As an example, the size of each MEMS mirror 51 is 0.5 to 0.8 millimeters (mm). A beam diameter of laser light emitted from the light projector 10a is about 1 mm to 3 mm. Therefore, as illustrated in FIG. 3, at least one MEMS mirror (for example, the MEMS mirror 51b) is irradiated with the reference pulsed light SP. On the other hand, at least two MEMS mirrors are irradiated with the reflected pulsed light RP because the reflected pulsed light RP is the light obtained by reflecting and diffusing the reference pulsed light SP by the object MT. In the present embodiment, all of the three MEMS mirrors 51 are irradiated with the reflected pulsed light RP.

The MEMS mirrors 51a, 51b, and 51c perform, for example, reciprocating rotational movement by being synchronously driven at the same resonance frequency. The reciprocating rotational movement may be 360-degree rotation around the rotary axis or may be a repetitive rotational movement by 360 degrees or less in a symmetrical directions (for example, in left and right directions in FIG. 3). During the reciprocating rotational movement of the MEMS mirrors 51a, 51b, and 51c, at least one MEMS mirror is irradiated with the reference pulsed light SP emitted at a predetermined repetition interval.

By the way, when the object MT is located at a position sufficiently distant relative to the size of the MEMS mirrors 51 and an interval between the mirrors, it may be assumed that the reflected pulsed light RP is incident on the MEMS mirrors 51 as parallel light. When the MEMS mirror 51 is a single mirror, the reflected pulsed light RP deflected at the one mirror surface reaches a light receiving surface while maintaining a wave front phase regardless of the angle of the MEMS mirror 51.

Figure 4B:
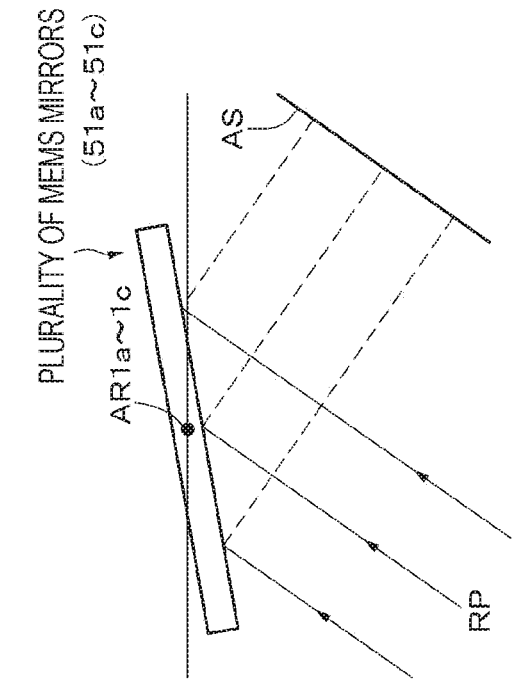
FIGS. 4A and 4B are diagrams to describe examples of arrangement and the like of movable mirrors constituting the scanning unit.
Figure 4A:
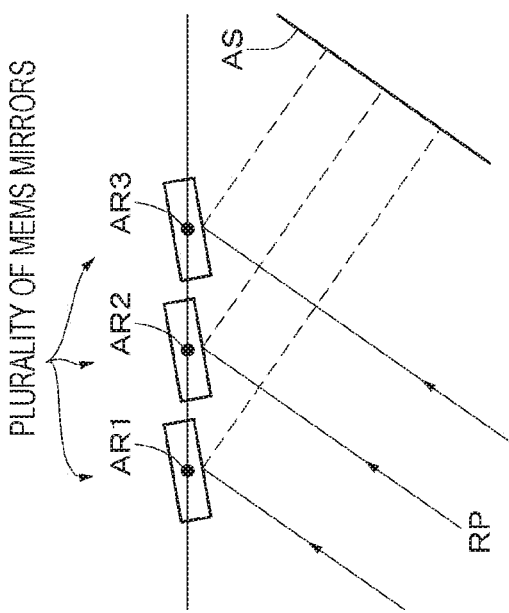

In contrast, as illustrated in FIG. 4A, in a case where rotary axes AR1 to 3 of the plurality of MEMS mirrors 51 are offset in a normal direction of the rotary axes AR1 to AR3 of the MEMS mirrors 51, a time to reach a light receiving surface AS of the reflected pulsed light RP deflected by each of the mirrors is varied by an offset amount of each of the MEMS mirrors 51 and an angle of each of the MEMS mirrors 51. This becomes a cause of variation of the time of flight T_TOF of the laser light, and leads to deterioration of the distance measurement accuracy.

To avoid this problem, in the present embodiment, the MEMS mirrors 51a to 51c are arranged such that the rotary axes AR1a to AR1c corresponding to the respective MEMS mirrors 51a to 51c coincide on a same straight line. Note that the rotary axes AR1a to 1c are effective mirror rotary axes and are not necessarily limited to axes actually rotated.

Note that it is sufficient that the rotary axes AR1a to AR1c corresponding to the respective MEMS mirrors 51a to 51c effectively coincide with each other and are not precisely coincide on the same straight line. In other words, it is ideal that the rotary axes AR1a to 1c be arranged on the same straight line, but as far as there is no influence given to the distance measurement accuracy, a slight deviation (offset) is allowable.

[Regarding Exemplary Operation of Distance Measurement Apparatus]

Next, an exemplary operation of the distance measurement apparatus 1 will be described. The driver of the light projector 10a is operated in accordance with control of the reference signal generator 10b of the light projection unit 10, and the reference pulsed light SP is emitted from the light projector 10a. An optical path of a part of the reference pulsed light SP is changed by the polarizing beam splitter PBS, and received by the light receiver 20a of the first measurement unit 20. A current signal is output from the light receiver 20a by receiving the part of the reference pulsed light SP. After the current signal is converted into a voltage signal in the converter 20b, the voltage signal is limitedly amplified by the amplifier 20c. The amplified voltage signal is output to the clock unit 20d. The clock unit 20d measures the light projection timing ta at which voltage of the amplified voltage signal reaches the predetermined threshold, and generates a digital signal indicating the light projection timing ta at which the reference pulsed light SP is received. The clock unit 20d outputs the digital signal indicating the light projection timing to to the calculation unit 40.

Figure 5:
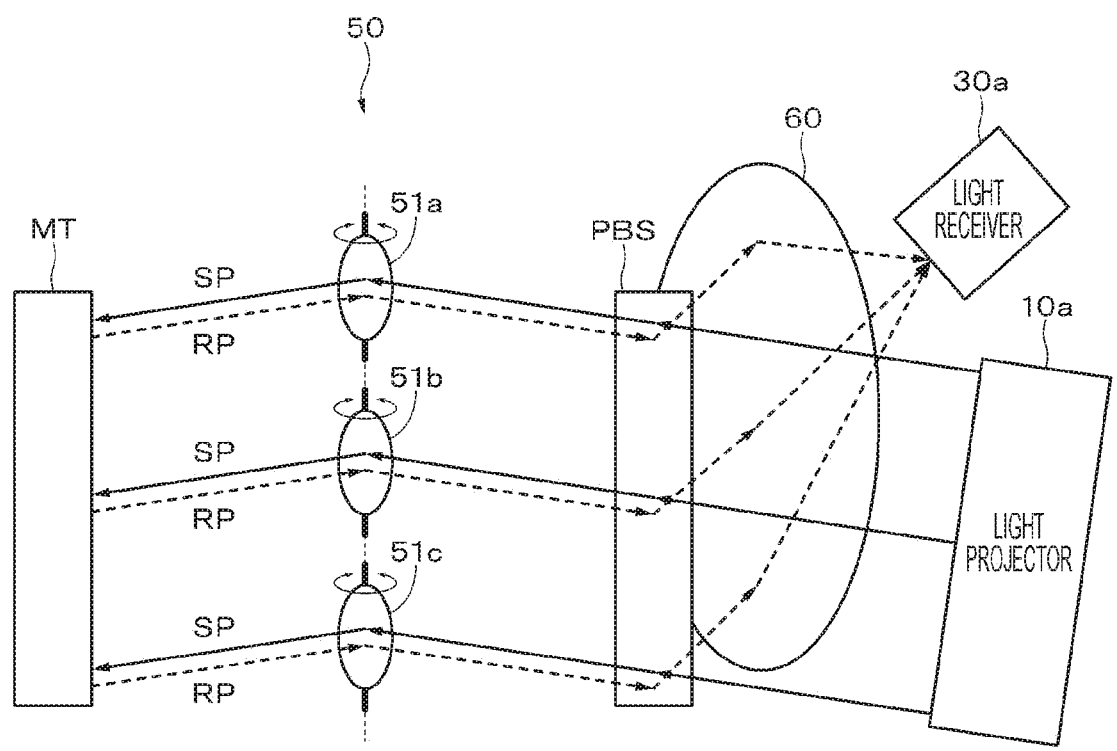
FIG. 5 is a diagram to describe exemplary operation of the distance measurement apparatus according to the first embodiment.

On the other hand, at least one MEMS mirror of the MEMS mirrors 51a to 51c constituting the scanning unit 50 is irradiated with the part of the reference pulsed light SP as illustrated in FIG. 5, and the object MT is irradiated while changing the direction thereof. The reflected pulsed light RP from the object MT returns again in the optical axis same as the optical axis of the reference pulsed light SP via at least two MEMS mirrors of the MEMS mirrors 51a to 51c constituting the scanning unit 50, and guided to the light receiver 30a of the second measurement unit 30 by the polarizing beam splitter PBS.

The reflected pulsed light RP is received by the light receiver 30a. A current signal is output from the light receiver 30a by receiving the reflected pulsed light RP, and the current signal is converted into a voltage signal in the converter 30b. After the current signal is converted into the voltage signal in the converter 30b, the voltage signal is limitedly amplified by the amplifier 30c. The amplified voltage signal is output to the clock unit 30d. The clock unit 30d measures the light receiving timing tb at which voltage of the amplified voltage signal reaches the predetermined threshold, and generates a digital signal indicating the light receiving timing tb at which the reflected pulsed light RP is received. The clock unit 30d outputs a digital signal indicating the light receiving timing tb to the calculation unit 40.

The calculation unit 40 obtains the time of flight T_TOF of the pulsed light from the difference between the light projection timing to supplied from the clock unit 20d and the light receiving timing tb supplied from the clock unit 30d. Then, a distance to the object MT is measured by multiplying the time of flight T_TOF by a light speed and ½.

According to the above-described first embodiment, the object is irradiated with the pulsed light emitted from the light projection unit while the scanning unit including the plurality of MEMS mirrors synchronously operated performs scanning, and therefore, distance information of two-dimensional (2D) or 3D space with high accuracy.

2. Second Embodiment

Next, a second embodiment will be described. Note that matters described in a first embodiment are applicable to the second embodiment unless otherwise particularly specified, and similarly, a configuration having a same characteristic will be denoted by the same reference sign and a repetitive description thereof will be omitted.

[Exemplary Configuration of Distance Measurement Apparatus]

Figure 6:
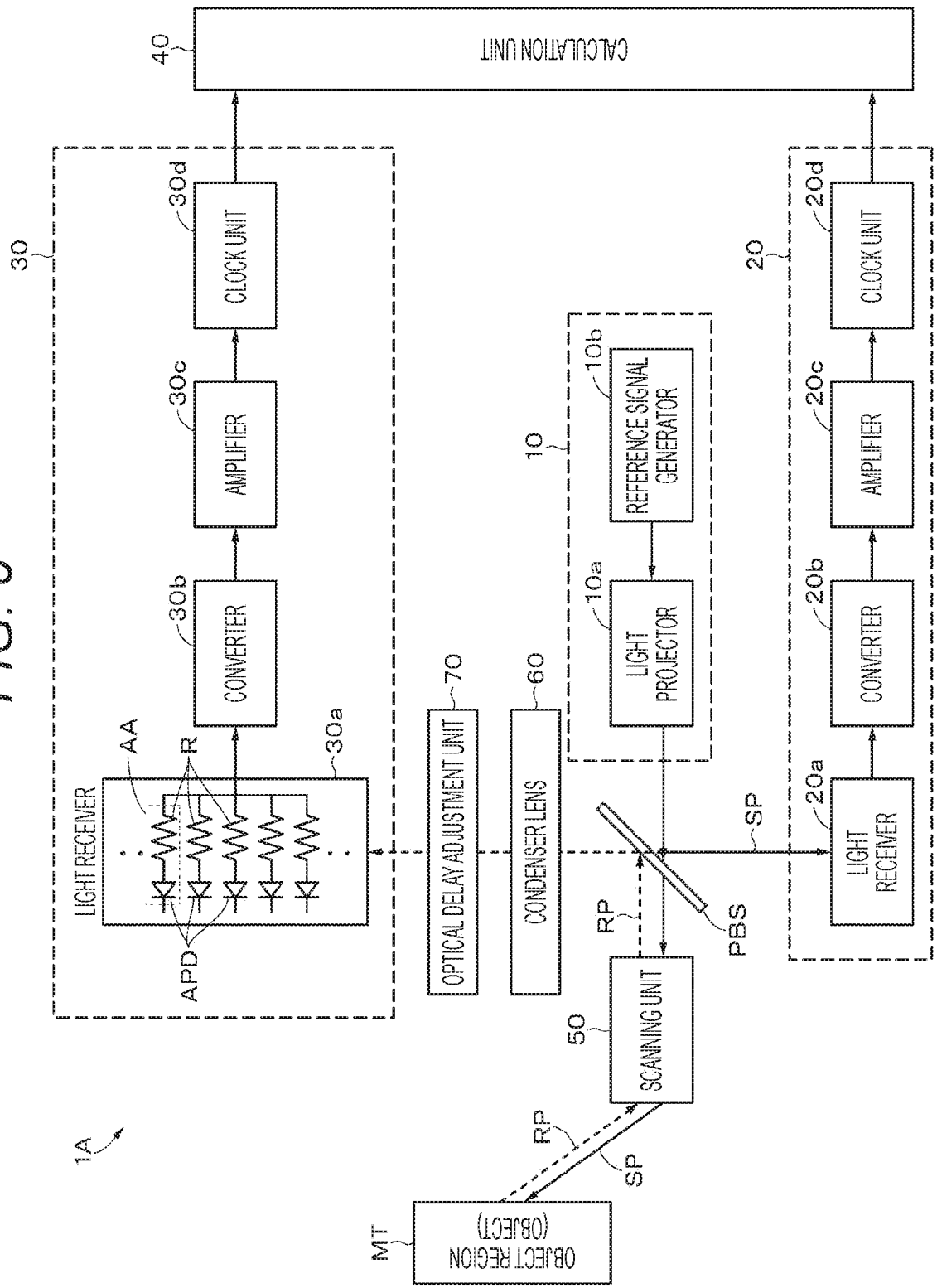
FIG. 6 is a block diagram to describe an exemplary configuration of a distance measurement apparatus according to a second embodiment.

FIG. 6 is a block diagram illustrating an exemplary configuration of a distance measurement apparatus (distance measurement apparatus 1A) of the second embodiment. The configuration of the distance measurement apparatus 1A differs from a configuration of a distance measurement apparatus 1 in that the distance measurement apparatus 1A includes an optical delay adjustment unit 70 between a light receiver 30a of a second measurement unit 30 and a condenser lens 60.

The optical delay adjustment unit 70 includes an optical delay adjustment element such as a micro lens or a micro rod including glass or a resin. The optical delay adjustment unit 70 corrects optical delay caused by a deviation of an optical distance, more specifically, a deviation of light receiving timing of reflected pulsed light RP in the light receiver 30a.

[Regarding Relative Positional Relation between Condenser Lens and Light Receiving Surface of Light Receiver]

Figure 7:
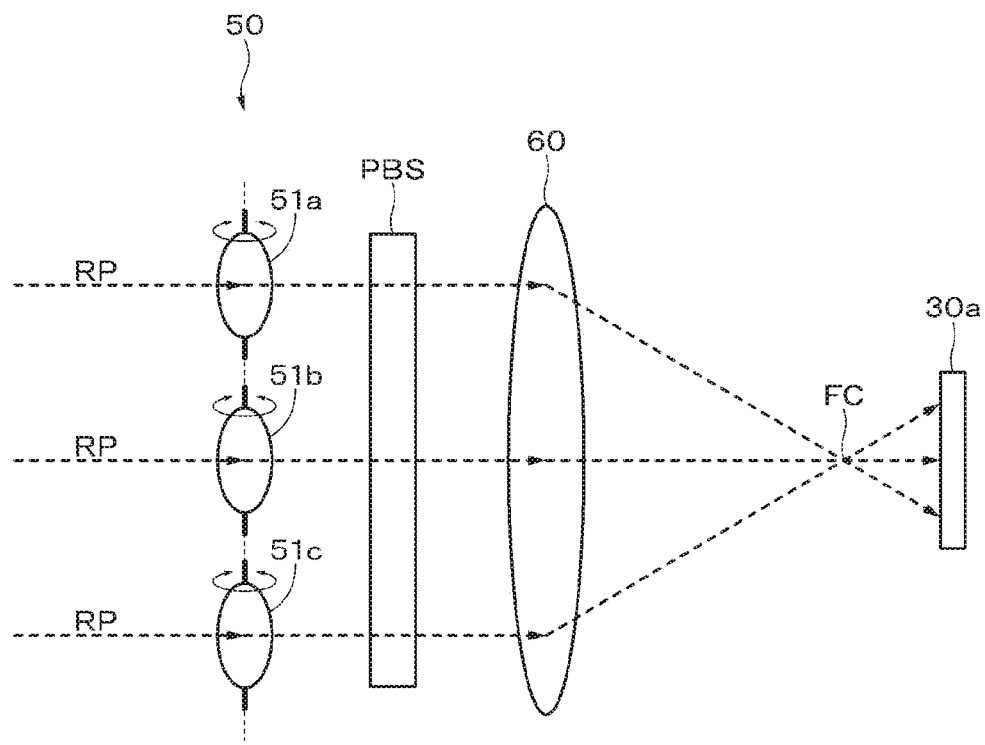
FIG. 7 is a diagram to describe a positional relation between a focal position of a condenser lens and a light receiving surface of a light receiver.

FIG. 7 is a diagram schematically illustrating a relative positional relation between a scanning unit 50, a polarizing beam splitter PBS, the condenser lens 60, and the light receiver 30a. In a case of an optical system as illustrated in FIG. 7, optical distances from MEMS mirrors 51a to 51c to the light receiving surface can be equalized by arranging, at a focal position FC of the condenser lens 60, a light receiving surface of the light receiver 30a (hereinafter abbreviated as a light receiving surface as appropriate). In the focal position FC, variation of T_TOF can be minimized. Therefore, in a case of using a pin-photo diode (PD) or an avalanche photodiode APD as a light receiving element, it is desirable to place the light receiving surface at the focal position FC.

However, like the present embodiment, in a case of using a SPAD as the light receiving element and constituting the light receiver 30a by using a multi-pixel SPAD, it is not desirable to arrange the light receiving surface at the focal position FC. The reason is that it is desirable to irradiate all of pixels uniformly and detect the greater number of photons because the SPAD responds to only one photon even when the SPAD receives a plurality of photons at a time. With this configuration, a large output can be obtained from the light receiver 30a. Due to the above-described reason, in a case where the light receiver 30a is formed as the multi-pixel SPAD, it is preferable that the light receiver 30a (specifically, the light receiving surface of the light receiver 30a) be arranged at a position deviated forward or backward from the focal position FC.

Figure 8:
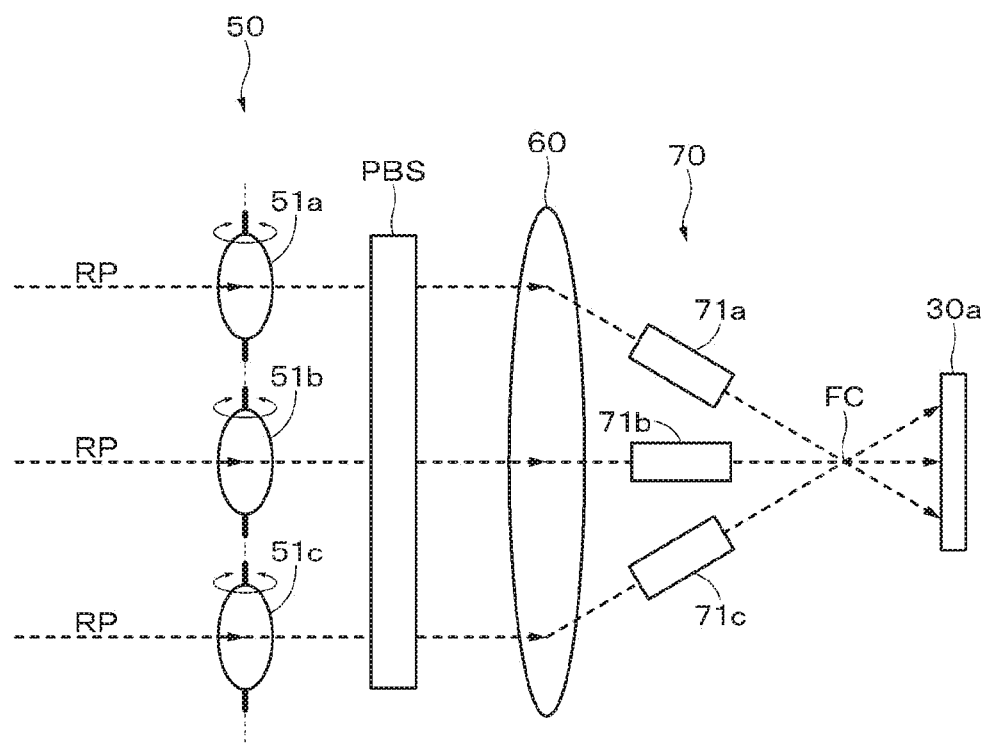
FIG. 8 is a diagram to describe an optical delay adjustment unit according to the second embodiment.

On the other hand, since an optical distance difference in the reflected pulsed light RP that has reached each of the pixels of the light receiving surface is generated, there is a possibility that time of flight T_TOF of the pulsed light is varied and distance measurement accuracy is degraded. Therefore, as illustrated in FIG. 8, the optical delay adjustment unit 70 used to correct the optical distance difference may be provided between the condenser lens 60 and the light receiving surface in order to prevent the deterioration of the distance measurement accuracy. The optical delay adjustment unit 70 includes, for example, optical delay adjustment elements 71a to 71c provided corresponding to the respective MEMS mirrors 51a to 51c. Note that, the optical delay adjustment elements 71a to 71c are arranged on a front side of the focal position FC in FIG. 8, but may also be arranged on a back side of the focal position FC.

As described above, according to the second embodiment, even when the light receiver receives a plurality of photons at a time, it is possible to prevent the deterioration of the distance measurement accuracy which may be caused in a case of having the configuration in which the plurality of light receiving elements like the SPADs each responding to only one photon is arranged. Moreover, it is possible to prevent the deterioration of the distance measurement accuracy which may be caused by the optical distance difference of the reflected pulsed light that reaches the light receiving surface of the light receiver.

3. Third Embodiment

Next, a third embodiment will be described. Note that matters described in first and second embodiments are applicable to the second embodiment unless otherwise particularly specified, and similarly, a configuration having the same characteristic will be denoted by the same reference sign and a repetitive description thereof will be omitted.

In the first and second embodiments, a polarizing beam splitter PBS is used as a system to separate light waves. In a case where a beam diameter of reference pulsed light SP is sufficiently large, all of a plurality of MEMS mirrors 51a to 51c is irradiated with the reference pulsed light SP, reflected pulsed light RP is also received by using all of the plurality of MEMS mirrors 51a to 51c, and the received light is guided to the light receiver 30a by the polarizing beam splitter PBS.

Figure 9A:
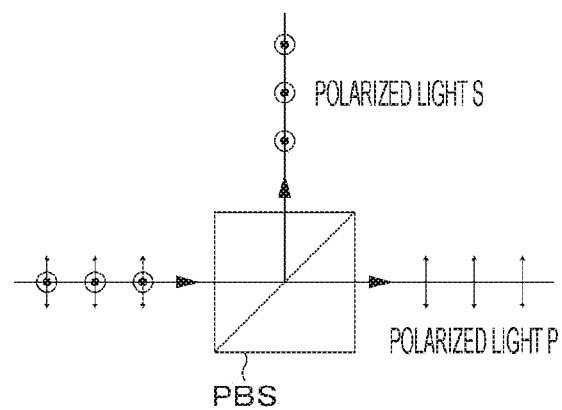
FIGS. 9A and 9B are diagrams illustrating an exemplary configuration of a part of a distance measurement apparatus according to a third embodiment.

By the way, as schematically illustrated in FIG. 9A, the polarizing beam splitter PBS has an optical characteristic to transmit either polarized light P or change S and reflect either one thereof. Since laser light (semiconductor laser light) emitted from the light projector 10a has a polarization characteristic, reference pulsed light SP emitted from a light projector 10a includes the polarized light P, for example. In this case, when the polarizing beam splitter PBS is installed such that the polarized light P is transmitted and the polarized light S is reflected, the reference pulsed light SP from the light projector 10a passes through the polarizing beam splitter PBS and is emitted to an object region almost without any loss. On the other hand, the polarization characteristic of the reference pulsed light SP emitted to an object MT is lost, and the reflected pulsed light RP having no polarization characteristic is incident on the polarizing beam splitter PBS again. A component of the polarized light S included in the reflected pulsed light RP is reflected at the polarizing beam splitter PBS and guided to the light receiver 30a, and a component of the polarized light P passes through and becomes stray light. Assuming that the polarization characteristic of the reflected pulsed light RP is completely eliminated, the reflected pulsed light reaching the light receiver 30a is reduced to about 50%. In other words, loss of light amount occurs.

Figure 9B:
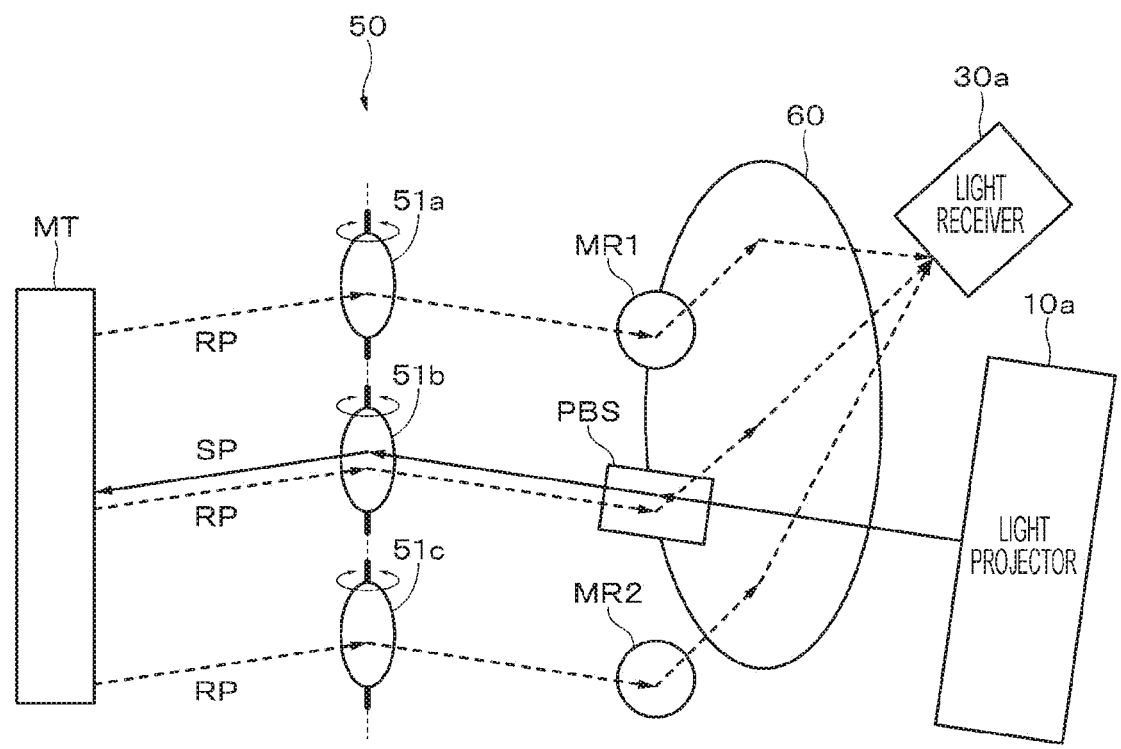

Accordingly, as illustrated in FIG. 9B, in a case where a beam diameter of the reference pulsed light SP emitted from the light projector 10a is sufficiently small, the reflected pulsed light RP can be received with higher efficiency by limiting, to an optical path of the reference pulsed light SP, an optical path passing via the polarizing beam splitter PBS. In other words, the reference pulsed light SP is emitted to the object MT via the polarizing beam splitter PBS by using a part of the plurality of MEMS mirrors (for example, the MEMS mirror 51b).

The reflected pulsed light RP from the object MT is received by using all of the plurality of MEMS mirrors (MEMS mirrors 51a to 51c), but as for the reflected pulsed light RP having an optical axis same as that of the reference pulsed light SP, the component of the polarized light S thereof is reflected and guided to the light receiver 30a by using the polarizing beam splitter PBS. The reflected pulsed light RP guided via the other MEMS mirrors 51a and 51c is reflected and guided to the light receiver 30a by using total reflection mirrors MR1 and MR2, for example. With this configuration, as for the reflected pulsed light RP having the optical axis same as that of the reference pulsed light SP, the 50% light amount loss occurs similar to the above-described case, but as for the other reflected pulsed light RP, there is no light amount loss and it is possible to reduce the light amount loss of the entire system. Note that the total reflection mirrors MR1 and MR2 may be independent mirrors provided corresponding to the MEMS mirrors 51a and 51c, or may be one mirror including a hole formed in the optical axis direction same as the optical axis of the reference pulsed light SP. Furthermore, arrangement of the MEMS mirror 51 may be devised such that only one MEMS mirror 51b is irradiated with the reference pulsed light SP in accordance with the beam diameter of the laser light.

According to the third embodiment, it is possible to reduce the light amount loss of the reflected pulsed light that reaches a light receiving surface of the light receiver. Therefore, it is possible to prevent deterioration of distance measurement accuracy caused by the light amount loss.

4. Modified Examples

While the plurality of embodiments of the present disclosure have been specifically described above, the present disclosure is not limited to the above-described embodiments, and various kinds of modifications can be made based on the technical idea of the present disclosure.

Figure 10:
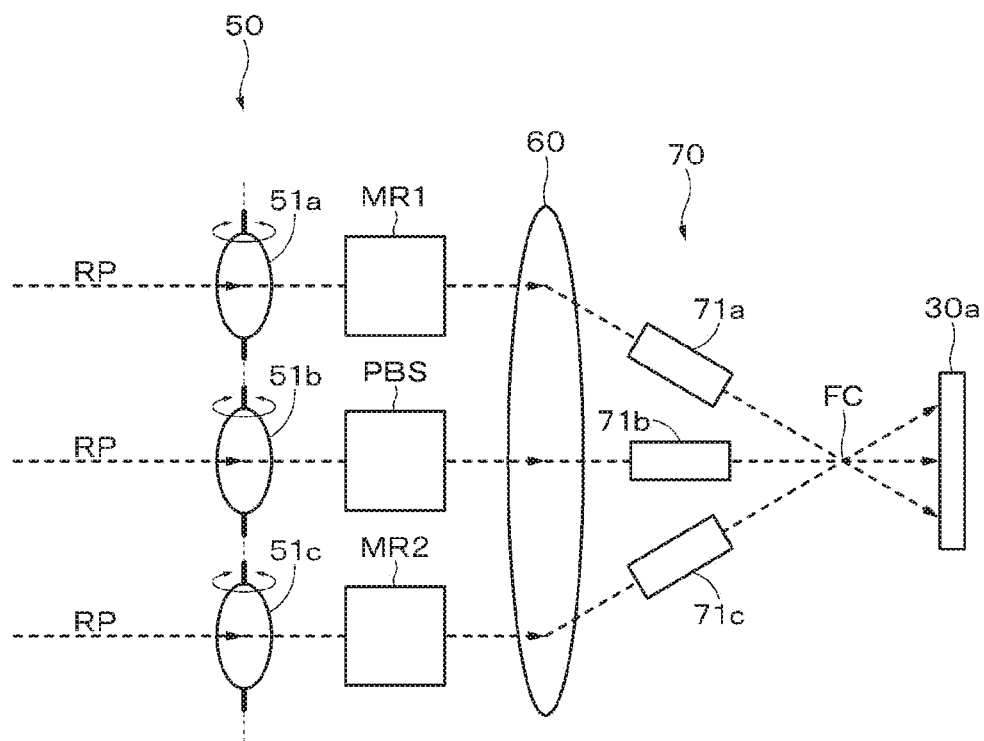
FIG. 10 is a diagram to describe a modified example.

The above-described embodiments can be mutually combined. For example, as illustrated in FIG. 10, it may be possible to adopt, in the distance measurement apparatus, a configuration in which the total reflection mirrors MR1 and MR2 described in the third embodiment are used as a system to separate light waves in addition to the polarizing beam splitter PBS while the optical delay adjustment elements 71a to 71c that correct an optical distance difference described in the second embodiment are used. Note that it is possible to further correct, by the optical delay adjustment element 71b, an optical distance difference that may be caused when an optical element (such as the polarizing beam splitter PBS) for optical wave separation is introduced only in a part of optical paths from the MEMS mirrors 51a to 51c to the light receiver 30a.

Figure 11:
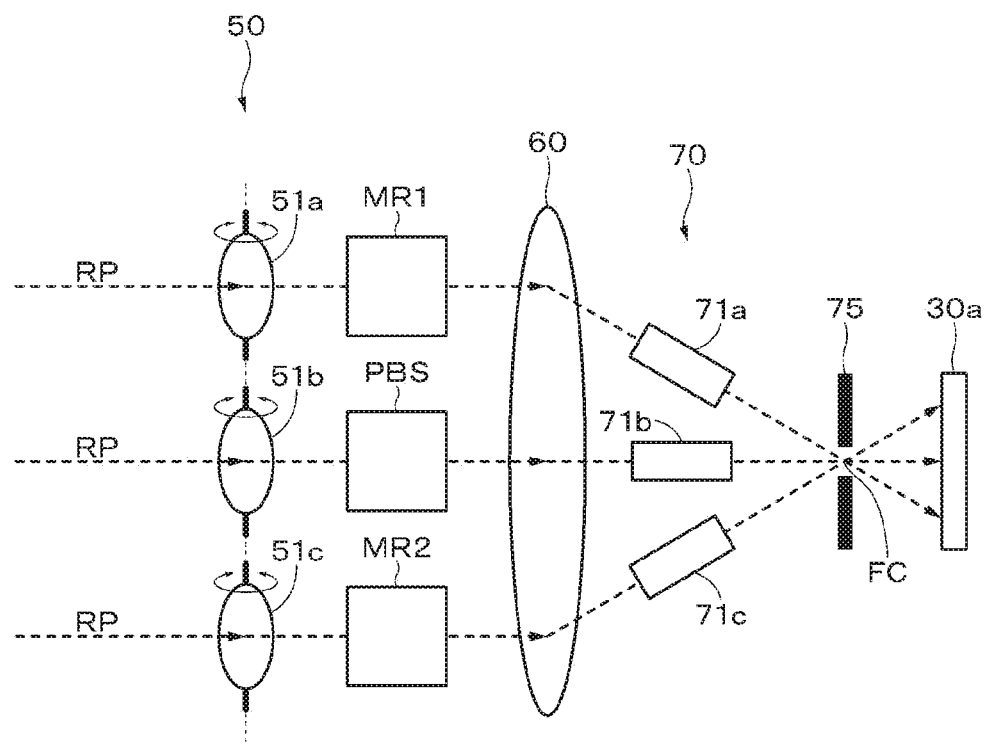
FIG. 11 is a diagram to describe a modified example.

As illustrated in FIG. 11, a pinhole 75 may be arranged at the focal position FC of the condenser lens 60 or in the vicinity thereof. In an optical system illustrated in FIG. 11, since the pinhole 75 is arranged at the focal position FC, light incident on each of the MEMS mirrors 51a to 51c at an angle different from parallel light can be prevented from reaching the light receiving surface of the light receiver 30a. In other words, the pinhole 75 functions as a kind of a noise cut filter, and ambient light noise can be reduced.

Note that, in the case of the configuration illustrated in FIG. 11, there is no optical distance difference generated by the condenser lens 60, but a difference is generated in the optical distance from the MEMS mirrors 51 to the light receiving surface of the light receiver 30a due to a difference of the optical elements such as the polarizing beam splitter PBS and the total reflection mirrors MR1 and MR2 interposed between the MEMS mirrors 51 and the light receiver 30a. The reason is that the total reflection mirrors MR1 and MR2 do not change the optical distance with respect to an actual distance whereas a dielectric material constituting the polarizing beam splitter PBS increases the optical distance. This causes a difference in the timing at which each of the SPADs constituting the light receiver 30a receives the light, and leads to deterioration of accuracy of the time of flight T_TOF. In other words, the distance measuring accuracy is deteriorated. Therefore, even in the case of the configuration illustrated in FIG. 11, it is preferable to provide the optical delay adjustment unit 70 (for example, the optical delay adjustment elements 71a to 71c).

Figure 12:
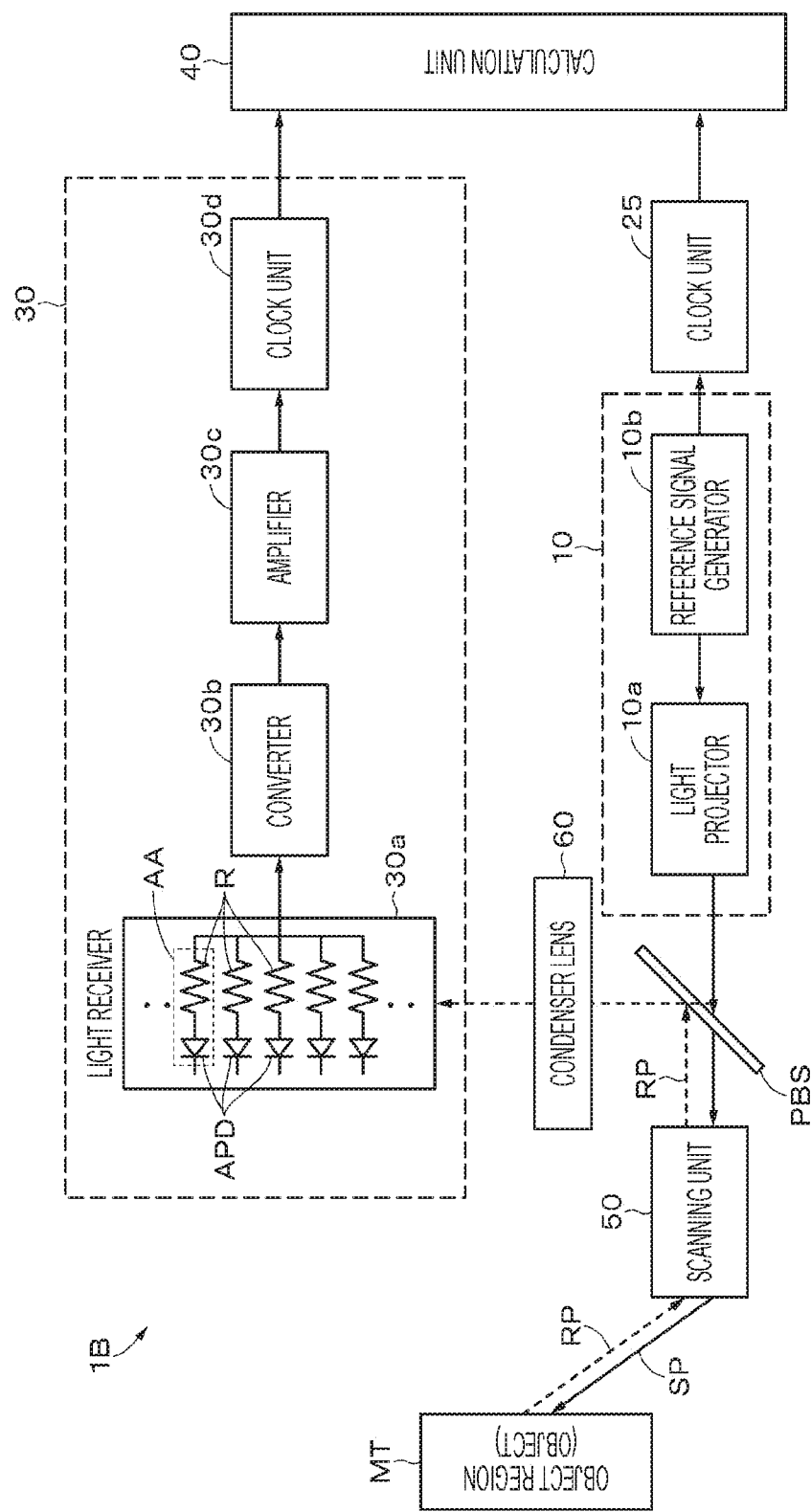
FIG. 12 is a block diagram to describe an exemplary configuration of a distance measurement apparatus according to a modified example.

The distance measurement apparatus does not necessarily include the two measurement units. FIG. 12 is a block diagram illustrating an exemplary configuration of a distance measurement apparatus (distance measurement apparatus 1B) in a modified example. The distance measurement apparatus 1B includes, for example, a clock unit 25 in place of the first measurement unit 20. The clock unit 25 includes, for example, a TDC. The reference signal generator 10b supplies the clock unit 25 with timing (time information) at which the reference pulsed light SP is emitted. The clock unit 25 may supply the calculation unit 40 with the light projection timing to on the basis of timing supplied from the reference signal generator 10b. A description of other processing will be omitted because the other processing is similar to that in the distance measurement apparatus 1.

Figure 13:
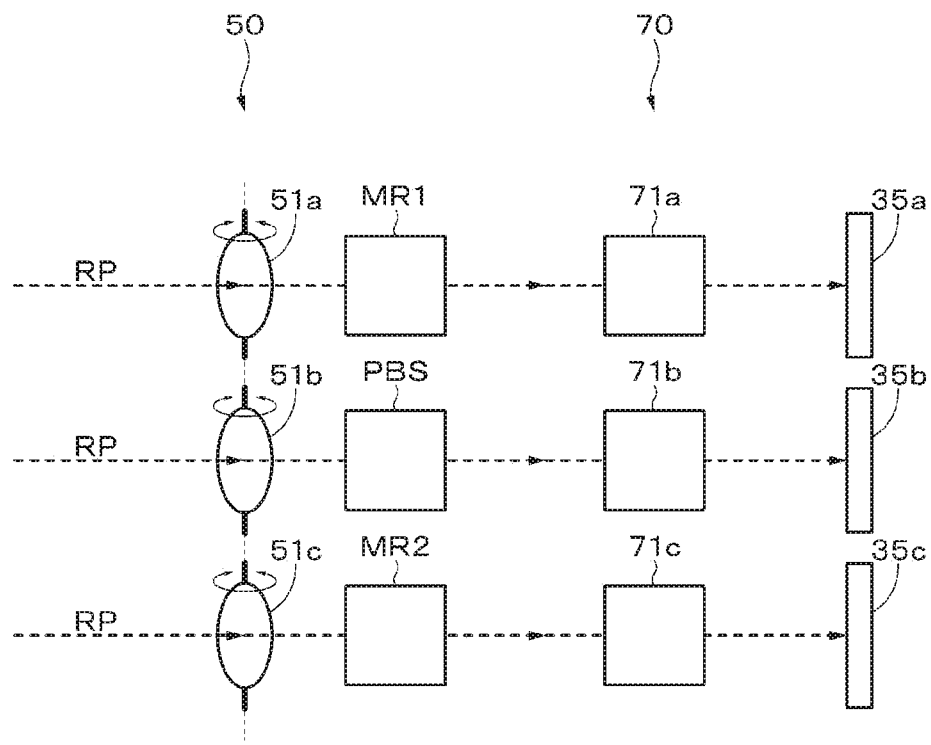
FIG. 13 is a diagram to describe a modified example.

The light receiver may be provided corresponding to the number of MEMS mirrors. For example, as illustrated in FIG. 13, light receivers 35a to 35c each having a configuration similar to that of the light receiver 30a may be provided corresponding to the MEMS mirrors 51a to 51c.

Figure 14:
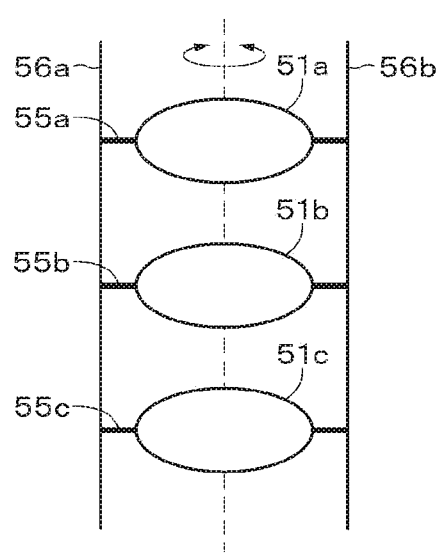
FIG. 14 is a diagram to describe a modified example.

In the above-described embodiments, for example, as illustrated in FIG. 14, the MEMS mirrors 51a to 51c may be rotated by applying specific periodic vibration to respective connection shafts 56a and 56b in a system in which torsion bars 55a, 55b, 55c supporting the MEMS mirrors 51a, 51b, 51c are connected by using the connection shafts. Thus, there is no need to include mechanical rotary axes, and it is sufficient that effective rotary axes are arranged on the same straight line.

Figure 15:
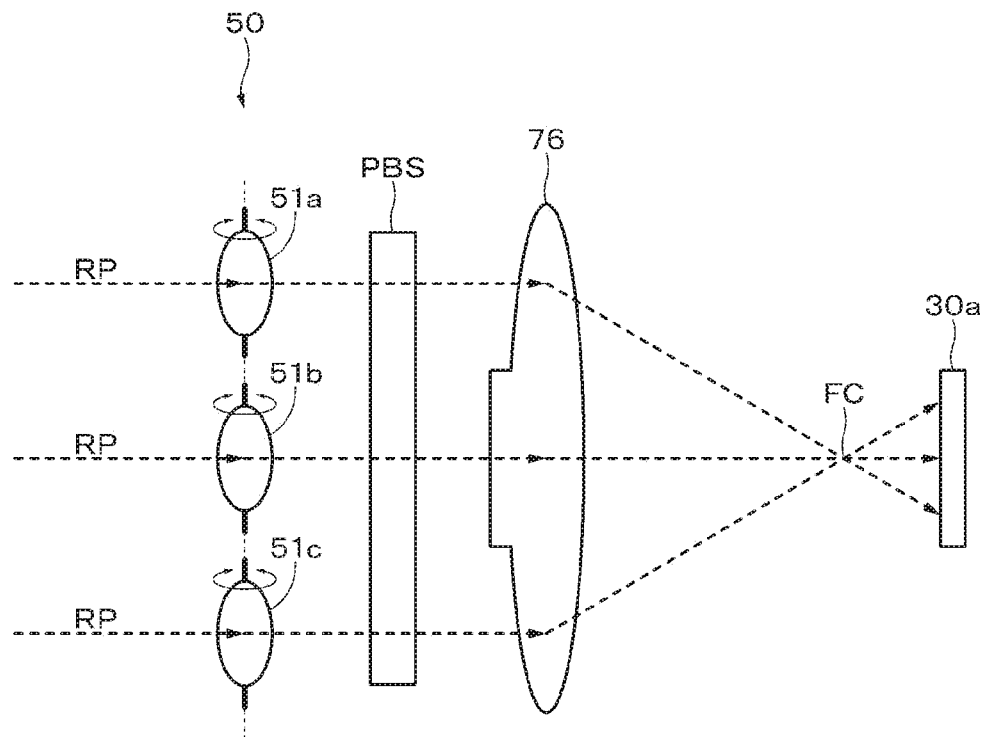
FIG. 15 is a diagram to describe a modified example.
Figure 16:
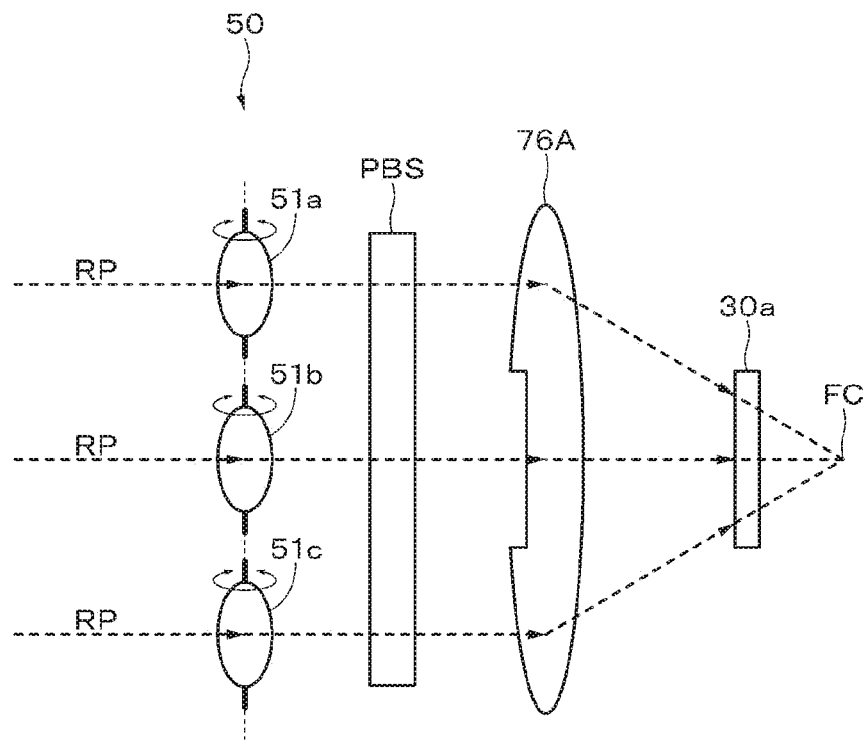
FIG. 16 is a diagram to describe a modified example.

As illustrated in FIG. 15, for example, the condenser lens 60 and the optical delay adjustment unit 70 may be integrated by using a lens 76 in which a thickness on an inner side is larger. The thick portion of the lens 76 functions as the optical delay adjustment unit 70. Furthermore, in a case where the light receiver 30a is arranged closer to the lens side than the focal position FC as illustrated in FIG. 16, a lens 76A in which a thickness on an outer side is larger is used. Note that the condenser lens 60 does not necessarily have a substantially round shape but is required to have the area necessary to condense the reflected pulsed light RP from the MEMS mirrors 51a to 51c. The number of the plurality of MEMS mirrors is not limited to three, and can be set to arbitrary number.

The distance measurement apparatus of the present disclosure may be used not only as a single distance measurement apparatus but also in a manner incorporated in various kinds of devices. For example, the distance measurement apparatus may be incorporated in a projector device. Then, distance measurement may be performed at each point on a wall surface that is a projection plane, and unevenness of the wall surface may be identified. Correction processing (contrast improvement processing, color tone improvement processing, and the like) may be performed for entire or a part of image data of a projection image in accordance with the identified unevenness of the wall surface. Furthermore, the distance measurement apparatus of the present disclosure is applicable to various kinds of electronic devices such as a game machine an imaging device.

The distance measurement apparatus of the present disclosure is also applicable to a safety device that detects a distance to a pedestrian, an obstacle, or the like, and actuates a brake in accordance with the distance. In other words, the distance measurement apparatus of the present disclosure is also applicable to a mobile object such as an automobile, a train, a plane, a helicopter, or a small aircraft in which such a safety device is possibly used. Furthermore, the distance measurement apparatus of the present disclosure is also applicable to a robot (a robot for customer service, a robot for disaster rescue, a robot for cleaning, or the like) and a crime prevention device.

In the present disclosure, for example, the configurations, the methods, the processes, the shapes, the materials, the values, and the like exemplified in the above-described embodiments are merely examples, and a configuration, a method, a process, a shape, a material, a value, and the like different therefrom may also be used as necessary. For example, when the area of the light receiver 30a is sufficiently large, the condenser lens 60 is unnecessary. Furthermore, in the configuration illustrated in FIG. 10, the condenser lens 60 is unnecessary when it is designed such that, for example, the mirror angles of the mirrors MR1, MR2, and the like are adjusted and the light reflected by the mirrors MR1, MR2, and the like is guided to the light receiver 30a. Thus, the condenser lens 60 is not constantly required. Furthermore, the present disclosure can be achieved by an apparatus, a method, a system including a plurality of devices, or the like, and the matters described in the embodiments and the modified examples can be mutually combined unless technical inconsistency occurs.

Note that the present disclosure can also have the following configurations.

(1)

A distance measurement apparatus including:

a light projector that projects reference pulsed light to an object region;

a light receiver that receives reflected pulsed light from the object region;

a scanning unit including a plurality of movable mirrors provided between the light projector and the object region and synchronously operated; and a calculation unit that calculates a distance to the object region on the basis of a difference between light projection timing of projecting the reference pulsed light and light receiving timing of receiving the reflected pulsed light.

(2)

The distance measurement apparatus recited in (1), further including: a first clock unit that measures light projection timing of projecting the reference pulsed light; and a second clock unit that measures timing of receiving the light by the light receiver.

(3)

The distance measurement apparatus recited in (1) or (2), in which the movable mirrors perform reciprocating rotational movement around rotary axes respectively, and the rotary axes are set on a same straight line.

(4)

The distance measurement apparatus recited in any one of (1) to (3), in which the object region is irradiated with the reference pulsed light by using at least one or more movable mirrors of the scanning unit, and the reflected pulsed light is received by using at least two or more movable mirrors of the scanning unit.

(5)

The distance measurement apparatus recited in any one of (1) to (4), further including a condenser lens to condense the reflected pulsed light received by each of the movable mirrors of the scanning unit.

(6)

The distance measurement apparatus recited in (5), in which the light receiver is provided at a position deviated from a focal position of the condenser lens.

(7)

The distance measurement apparatus according to (6), in which an optical delay adjustment element to correct optical delay is provided between the condenser lens and the light receiver.

(8)

The distance measurement apparatus recited in any one of (1) to (7), in which the light receiver includes a plurality of light receiving elements, and the light receiving element is an element that responds to only one photon at the time of receiving a plurality of photons at a time.

(9)

The distance measurement apparatus recited in (8), in which the light receiving element includes a SPAD.

(10)

The distance measurement apparatus recited in any one of (1) to (9), in which the plurality of movable mirrors includes a first movable mirror that is irradiated with the reference pulsed light, and a second movable mirror that is not irradiated with the reference pulsed light, and a light amount of the reflected pulsed light guided to the light receiver via the second movable mirror is set to be larger than a light amount of the reflected pulsed light guided to the light receiver via the first movable mirror.

(11)

The distance measurement apparatus recited in any one of (1) to (10), in which the light receiver is provided corresponding to each of the plurality of movable mirrors.

(12)

A vehicle including the distance measurement apparatus recited in any one of (1) to (11).

5. Exemplary Application

The technology according to the present disclosure is applicable to various kinds of products. For example, the technology according to the present disclosure may be embodied as a device mounted on any kind of moving objects such as an automobile, an electric vehicle, a hybrid electric vehicle, a motorcycle, a bicycle, a personal mobility, an airplane, a drone, a ship, a robot, a construction machine, and an agricultural machine (tractor).

Figure 17:
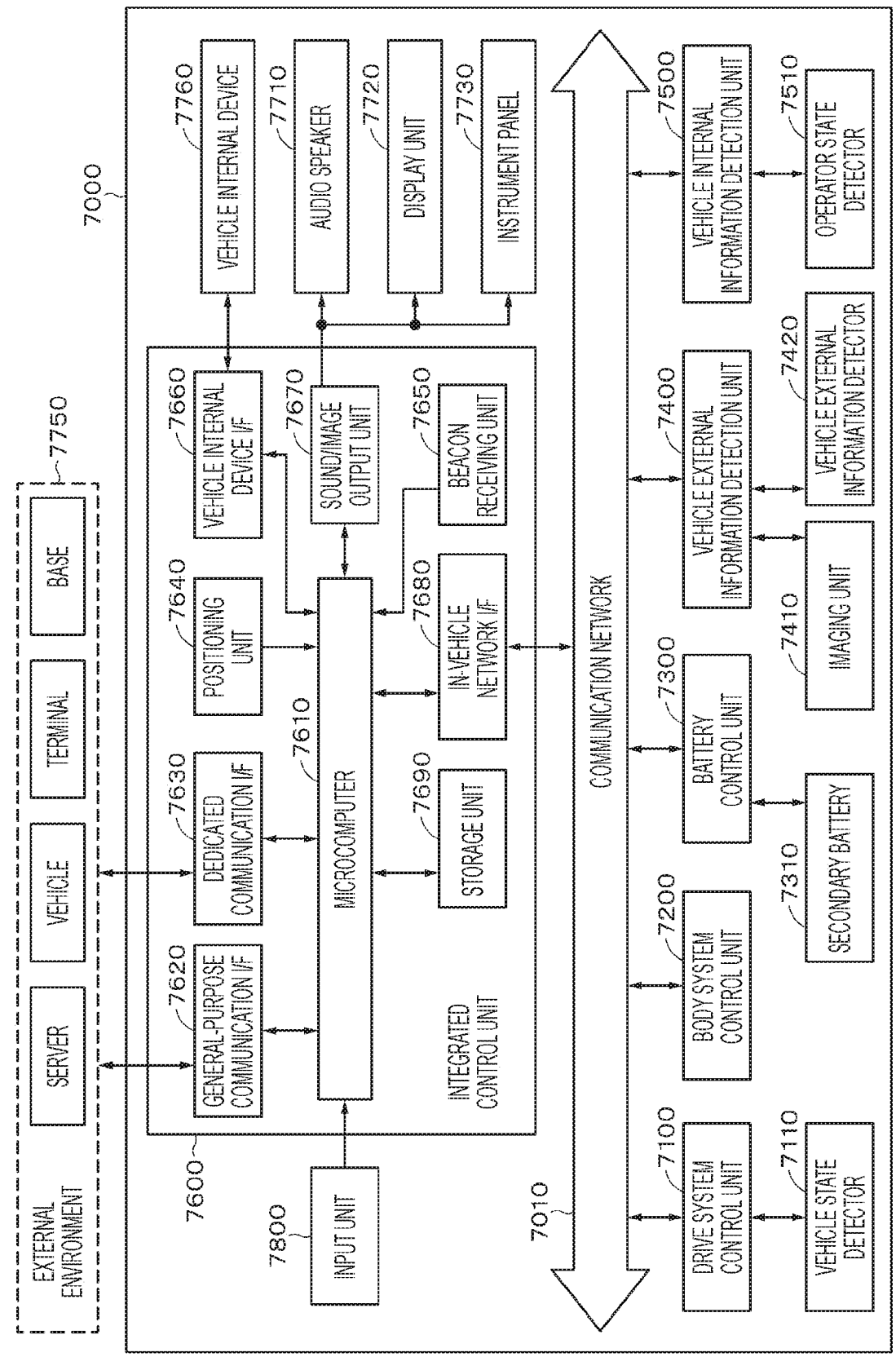
FIG. 17 is a block diagram illustrating an exemplary schematic configuration of a vehicle control system according to an exemplary application.

FIG. 17 is a block diagram illustrating a schematic exemplary configuration of a vehicle control system 7000 that is an exemplary moving object control system to which the technology according to the present disclosure may be possibly applied. The vehicle control system 7000 includes a plurality of electronic control units connected via a communication network 7010. In an example illustrated in FIG. 17, the vehicle control system 7000 includes a drive system control unit 7100, a body system control unit 7200, a battery control unit 7300, a vehicle external information detection unit 7400, a vehicle internal information detection unit 7500, and an integrated control unit 7600. The communication network 7010 connecting these control units connecting such a plurality of control units is, for example, an in-vehicle communication network conforming to an arbitrary standard such as the controller area network (CAN), the local interconnect network (LIN), the local area network (LAN), or the FlexRay (registered trademark)

Each of the control units includes a microcomputer that performs arithmetic processing in accordance with various kinds of programs, a storage unit that stores the programs executed by the microcomputer, parameters used for various kinds of arithmetic operation, or the like, a drive circuit that drives various kinds of devices to be controlled. Each of the control units includes a network I/F to communicate with other control units via the communication network 7010 and further includes a communication I/F to communicate with devices, sensors, and the like inside and outside the vehicle via wired communication or wireless communication. In FIG. 17, a microcomputer 7610, a general-purpose communication I/F 7620, a dedicated communication I/F 7630, a positioning unit 7640, a beacon receiving unit 7650, a vehicle internal device I/F 7660, a sound/image output unit 7670, an in-vehicle network I/F 7680, and a storage unit 7690 are illustrated as functional configurations of the integrated control unit 7600. Each of the other control units also includes a microcomputer, a communication I/F, a storage unit, and the like.

The drive system control unit 7100 controls operation of devices associated with a drive system of the vehicle in accordance with the various kinds of programs. For example, the drive system control unit 7100 functions as a control device for: a drive force generation device to generate drive force of the vehicle, such as an internal combustion engine or a drive motor; a drive force transmission mechanism to transmit the drive force to wheels; a steering mechanism to adjust a steering angle of the vehicle; a braking device to generate braking force of the vehicle; and the like. The drive system control unit 7100 may also have a function as a control device for an antilock brake system (ABS), an electronic stability control (ESC), and the like.

A vehicle state detector 7110 is connected to the drive system control unit 7100. The vehicle state detector 7110 includes, for example, a gyro sensor that detects an angular velocity of a shaft rotational motion of a vehicle body, an acceleration sensor that detects an acceleration rate of the vehicle, or at least one of sensors to detect an operation amount of an accelerator pedal, an operation amount of a brake pedal, a steering angle of a steering wheel, an engine speed, a rotation speed of the wheels, or the like. The drive system control unit 7100 performs arithmetic processing by using a signal received from the vehicle state detector 7110 and controls the internal combustion engine, the drive motor, an electric power steering device, a brake device, or the like.

The body system control unit 7200 controls operation of various kinds of devices equipped in the vehicle body in accordance with the various kinds of programs. For example, the body system control unit 7200 functions as a keyless entry system, a smart key system, a power window device, or a control device for various kinds of lamps such as a head lamp, a back lamp, a brake lamp, a turn indicator, or a fog lamp. In this case, radio waves transmitted from a portable device functioning as a substitute for a key, or a signal from various kinds of switches may be possibly received in the body system control unit 7200. The body system control unit 7200 accepts such reception of the radio wave or the signal, and controls a door lock device, the power window device, the lamp, and the like of the vehicle.

The battery control unit 7300 controls, in accordance with the various kinds of programs, a secondary battery 7310 that is a power supply source of the drive motor. For example, the battery control unit 7300 receives, from a battery device including the secondary battery 7310, information of a battery temperature, battery output voltage, remaining capacity of the battery, and the like. The battery control unit 7300 performs arithmetic processing by using these signals, and controls temperature adjustment of the secondary battery 7310, a cooling device provided in the battery device, or the like.

The vehicle external information detection unit 7400 detects information outside the vehicle on which the vehicle control system 7000 is mounted. For example, at least one of an imaging unit 7410 or a vehicle external information detector 7420 is connected to the vehicle external information detection unit 7400. The imaging unit 7410 includes at least one of a time of flight (ToF) camera, a stereo camera, a monocular camera, an infrared camera, or another camera. The vehicle external information detector 7420 includes at least one of, for example, an environment sensor to detect present weather or a present meteorological phenomenon, or a surrounding information detection sensor to detect another vehicle, an obstacle, a pedestrian, or the like around the vehicle on which the vehicle control system 7000 is mounted.

The environment sensor may be at least one of a raindrop sensor that detects rain weather, a fog sensor that detects fog, a sunshine sensor that detects a sunshine degree, or a snow sensor that detects snowfall, for example. The surrounding information detection sensor may include at least one of an ultrasonic sensor, a radar device, or a light detection and ranging, laser imaging detection and ranging (LIDAR) device The imaging unit 7410 and the vehicle external information detector 7420 may be provided as independent sensors or devices respectively, or may be provided as a device in which a plurality of sensors or devices is integrated.

Figure 18:
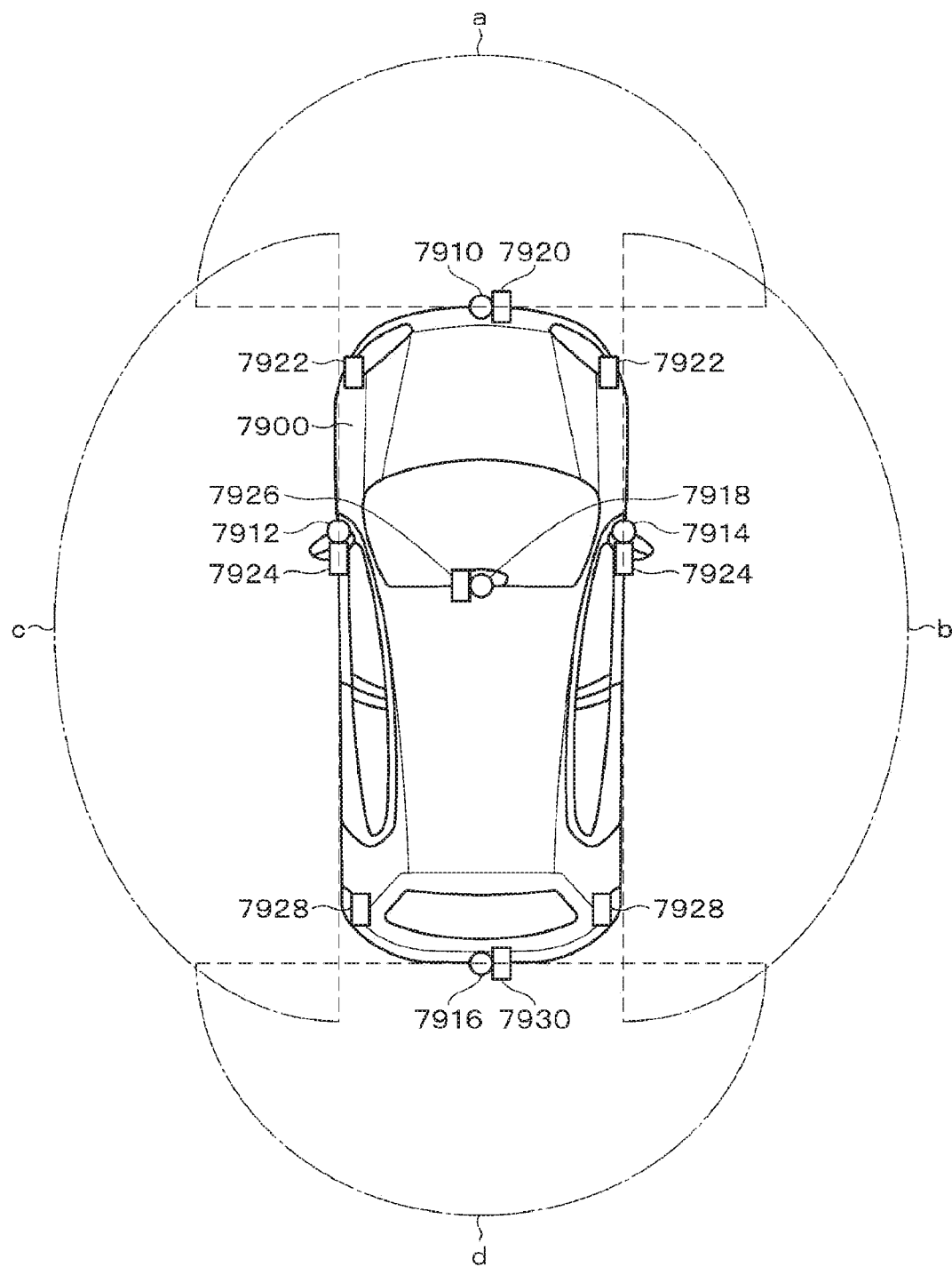
FIG. 18 is an explanatory diagram illustrating exemplary installing positions of a vehicle external information detector and an imaging unit according to the exemplary application.

Here, FIG. 18 illustrates exemplary installing positions of the imaging unit 7410 and the vehicle external information detector 7420. For example, imaging units 7910, 7912, 7914, 7916, or 7918 is provided at least one of positions of a front nose, side mirrors, a rear bumper, a back door, or an upper portion of a windshield inside a vehicle interior of a vehicle 7900. The imaging unit 7910 provided at the front nose and the imaging unit 7918 provided at the upper portion of the windshield in the vehicle interior mainly capture images ahead of the vehicle 7900. The imaging units 7912 and 7914 provided at the side mirrors mainly capture images on the sides of the vehicle 7900. The imaging unit 7916 provided at the rear bumper or the back door mainly capture an image behind the vehicle 7900. The imaging unit 7918 provided at the upper portion of the windshield in the vehicle interior is mainly used to detect a preceding vehicle, a pedestrian, an obstacle, a traffic light, a traffic sign, a lane, or the like.

Note that FIG. 18 illustrates exemplary photographing ranges of the respective imaging units 7910, 7912, 7914, and 7916. An imaging range a represents an imaging range of the imaging unit 7910 provided at the front nose, imaging ranges b and c represent imaging ranges of the imaging units 7912 and 7914 provided at the respective side mirrors, and an imaging range d represents an imaging range of the imaging unit 7916 provided at the rear bumper or the back door. For example, a bird's-eye view image of the vehicle 7900 viewed from above can be obtained by overlapping pieces of image data captured by the imaging units 7910, 7912, 7914, and 7916.

Vehicle external information detectors 7920, 7922, 7924, 7926, 7928, and 7930 provided on a front part, a rear part, side parts, corner parts, and the upper portion of the windshield inside the vehicle interior of the vehicle 7900 may be ultrasonic sensors or radar devices, for example. The vehicle external information detectors 7920, 7926, and 7930 provided at the front nose, the rear bumper, the back door, and the upper portion of the windshield inside the vehicle interior of the vehicle 7900 may be LIDAR devices, for example. These vehicle external information detectors 7920 to 7930 are mainly used to detect a preceding vehicle, a pedestrian, an obstacle, or the like.

Returning to FIG. 17, the description will be continued. The vehicle external information detection unit 7400 causes the imaging unit 7410 to capture an image of the outside of the vehicle, and receives the captured image data. Furthermore, the vehicle external information detection unit 7400 receives detection information from the connected vehicle external information detector 7420. In a case where the vehicle external information detector 7420 is an ultrasonic sensor, a radar device, or a LIDAR device, the vehicle external information detection unit 7400 transmits ultrasonic waves, electromagnetic waves, or the like and further receives information of received reflected waves. The vehicle external information detection unit 7400 may perform object detection processing or distance detection processing relative to a person, a vehicle, an obstacle, a traffic sign, a character on a road surface, or the like on the basis the received information. The vehicle external information detection unit 7400 may perform environment recognition processing to recognize rainfall, fog, road surface condition, or the like on the basis of the received information. The vehicle external information detection unit 7400 may calculate a distance to an object located outside the vehicle on the basis of the received information.

Furthermore, the vehicle external information detection unit 7400 may perform image recognition processing or the distance detection processing relative to a person, a vehicle, an obstacle, a traffic sign, a character on a road surface, or the like on the basis of received image data. The vehicle external information detection unit 7400 performs processing such as distortion correction or position adjustment for the received image data and combines pieces of image data captured by the different imaging units 7410 to generate a bird's-eye view image or a panorama image. The vehicle external information detection unit 7400 may perform viewpoint conversion processing by using the pieces of image data captured by the different imaging units 7410.

The vehicle internal information detection unit 7500 detects vehicle internal information. For example, an operator state detector 7510 that detects a state of an operator is connected to the vehicle internal information detection unit 7500. The operator state detector 7510 may include a camera that captures an image of the operator, a biosensor that detects biological information of the operator, a microphone that collects sounds in the vehicle interior, or the like. The biosensor is provided on a seat, a steering wheel, or the like, for example, and detects biological information of an occupant who sits on a seat or the operator who holds the steering wheel. The vehicle internal information detection unit 7500 may calculate a degree of tiredness and a degree of concentration of the operator or may discriminate whether or not the operator is dozing on the basis of detection information received from the operator state detector 7510. The vehicle internal information detection unit 7500 may perform noise canceling processing or the like for a sound signal obtained by collecting the sounds.

The integrated control unit 7600 controls entire operation inside the vehicle control system 7000 in accordance with the various kinds of programs. An input unit 7800 is connected to the integrated control unit 7600. The input unit 7800 is implemented by a device such as a touch panel, a button, a microphone, a switch, a lever, or the like in which input operation may be possibly performed by an occupant. The integrated control unit 7600 may receive data obtained by recognizing a sound received through the microphone. The input unit 7800 may be, for example, a remote control device utilizing infrared or other radio waves, or may be an external connection device such as a mobile phone or a personal digital assistant (PDA) that can handle operation of the vehicle control system 7000. The input unit 7800 may be a camera, for example, and in this case, the occupant can input information by gesture. Alternatively, data obtained by detecting movement of a wearable device worn by the occupant may also be received. Moreover, the input unit 7800 may include, for example, an input control circuit or the like that generates an input signal on the basis of information input by the occupant or the like by using the above-described input unit 7800 and outputs the input signal to the integrated control unit 7600. The occupant or the like may input various kinds of data or provide a command for processing operation for the vehicle control system 7000 by operating the input unit 7800.

The storage unit 7690 may include a read only memory (ROM) that stores the various kinds of programs to be executed by the microcomputer, and a random access memory (RAM) that stores various kinds of parameters, arithmetic results, sensor values, and the like. Furthermore, the storage unit 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various kinds of devices existing in external environment 7750. The general-purpose communication I/F 7620 may mount a cellular communication protocol such as global system of mobile communications (GSM (registered trademark)), WiMAX, long term evolution (LTE), or LTE-Advanced (LTE-A), or a wireless LAN (also referred to as Wi-Fi (registered trademark)), Bluetooth (registered trademark), or the like. The general-purpose communication I/F 7620 may be connected to a device (for example, an application server or a control server) existing on an external network (for example, the Internet, a cloud network, or a company specific network) via a base station or an access point, for example. Furthermore, the general-purpose communication I/F 7620 may be connected to a terminal existing in the vicinity of the vehicle (for example, a terminal of an operator, a pedestrian or a shop, or a machine type communication (MTC) terminal) by using a peer to peer (P2P) technology, for example.

The dedicated communication I/F 7630 is a communication I/F that supports a communication protocol formulated for use in the vehicle. The dedicated communication I/F 7630 may mount, for example, a standard protocol such as wireless access in vehicle environment (WAVE) that is a combination of a lower layer IEEE802.11p and an upper layer that is IEE16609, dedicated short range communications (DSRC), or a cellular communication protocol. The dedicated communication I/F 7630 typically carries out V2X communication that is a concept including one or more of vehicle to vehicle communication, vehicle to infrastructure communication, vehicle to home communication, and vehicle to pedestrian communication.

The positioning unit 7640 receives, for example, a global navigation satellite system (GNSS) signal from a GNSS satellite (for example, a global positioning system (GPS) signal from a GPS satellite) and executes positioning, and then generates positional information including a latitude, a longitude, and an altitude of the vehicle. Note that the positioning unit 7640 may locate a present position by signal exchange with a wireless access point or may acquire positional information from a terminal having a positioning function, such as a cellular telephone, a PHS, or a smartphone.

The beacon receiving unit 7650 receives radio waves or electromagnetic waves transmitted from, for example, a wireless station installed on a road, or the like, and acquires information of a present position, traffic congestion, a blocked road, a required time, or the like. Note that functions of the beacon receiving unit 7650 may be included in the above-described dedicated communication I/F 7630.

The vehicle internal device I/F 7660 is a communication interface that intermediates connection between the microcomputer 7610 and various vehicle internal devices 7760 existing in the vehicle. The vehicle internal device I/F 7660 may establish wireless connection by using a wireless communication protocol such as the wireless LAN, the Bluetooth (registered trademark), the near field communication (NFC), or the wireless USB (WUSB). Moreover, the vehicle internal device I/F 7660 may establish wired connection such as a universal serial bus (USB), a high-definition multimedia interface (HDMI (registered trademark)), or a mobile high-definition link (MHL) via a connection terminal (and a cable, if necessary) not illustrated. The vehicle internal devices 7760 may include, for example, at least one of a mobile device or a wearable device owned by an occupant, or an information device carried in or installed in the vehicle. Furthermore, the vehicle internal devices 7760 may include a navigation device that performs route search to an arbitrary destination. The vehicle internal device I/F 7660 exchanges control signals or data signals with these vehicle internal devices 7760.

The in-vehicle network I/F 7680 is an interface that intermediates communication between the microcomputer 7610 and the communication network 7010. The in-vehicle network I/F 7680 exchanges signals and the like in accordance with a predetermined protocol supported by the communication network 7010.

The microcomputer 7610 of the integrated control unit 7600 controls the vehicle control system 7000 in accordance with the various kinds of programs on the basis of information acquired via at least one of the general-purpose communication I/F 7620, the dedicated communication I/F 7630, the positioning unit 7640, the beacon receiving unit 7650, the vehicle internal device I/F 7660, or the in-vehicle network I/F 7680. For example, the microcomputer 7610 may compute a control target value for the drive force generation device, the steering mechanism, or the braking device on the basis of the acquired information of the inside and the outside of the vehicle, and may output a control command to the drive system control unit 7100. For example, the microcomputer 7610 may perform cooperative control to implement functions of an advanced driver assistance system (ADAS) including prevention of vehicle collision, shock mitigation, following travel based on an inter-vehicle distance, travel at constant speed, alarm for vehicle collision, alarm for vehicle lane departure, or the like. Furthermore, the microcomputer 7610 may perform cooperative control, by controlling the drive force generation device, the steering mechanism, the braking device, or the like on the basis of the acquired vehicle surrounding information, in order to perform automated cruising or the like to autonomously travel without depending operator's operation.

The microcomputer 7610 may generate three-dimensional distance information between the vehicle and an object such as a construction or a person in the periphery, and may create local map information including surrounding information of the present position of the vehicle on the basis of the information acquired via at least one of the general-purpose communication I/F 7620, the dedicated communication I/F 7630, the positioning unit 7640, the beacon receiving unit 7650, the vehicle internal device I/F 7660, and the in-vehicle network I/F 7680. Furthermore, the microcomputer 7610 may predict, on the basis of the acquired information, a hazard such as a vehicle collision, an approaching pedestrian or the like, or entrance to a blocked road, and may generate a warning signal. The warning signal may be, for example, a signal to emit a warning sound or turn on a warning lamp.

The sound/image output unit 7670 transmits an output signal of at least one of a sound or an image to an output device that can provide visual or auditory notification to an occupant of the vehicle or to the outside of the vehicle. In the example of FIG. 17, an audio speaker 7710, a display unit 7720, and an instrument panel 7730 are exemplified as the output devices. The display unit 7720 may include at least one of, for example, an on-board display or a head-up display. The display unit 7720 may have an augmented reality (AR) display function. Besides these devices, the output device may include another device such as a headphone, a wearable device like an eyeglasses type display worn by the occupant, a projector, or a lamp. In a case where the output device is a display device, the display device visually displays, in various forms such as text, an image, a table, and a graph, results obtained from various kinds of processing performed by the microcomputer 7610 or information received from the other control units. Furthermore, in a case where the output device is a sound output device, the sound output device converts a sound signal including reproduced sound data, acoustic data, or the like into an analog signal, and auditorily outputs the analog signal.

Note that, in the example illustrated in FIG. 17, at least two control units connected via the communication network 7010 may be integrated into one control unit. Alternatively, each control unit may include a plurality of control units. Moreover, the vehicle control system 7000 may include another control unit not illustrated. Furthermore, in the above description, a part or all of the functions assumed by any one of the control units may be assumed by another control unit. In other words, as far as information is exchanged via the communication network 7010, predetermined arithmetic processing may be performed in any one of the control units. Similarly, a sensor or a device connected to any one of the control units may be connected to another control unit, and further a plurality of control units may mutually exchange detection information via the communication network 7010.

Note that the configurations, the functions, and the like of the distance measurement apparatus described in the embodiments and the modified examples above are applicable to, for example, the vehicle external information detection unit 7400.

REFERENCE SIGNS LIST

1, 1A, 1B Distance measurement apparatus
10a Light projector
20a, 30a Light receiver
20d, 30d Clock unit
40 Calculation unit
50 Scanning unit
60 Condenser lens
70 Optical delay adjustment unit
7900 Vehicle

The invention claimed is:
1. A distance measurement apparatus, comprising:
 a light projector configured to project reference pulsed light to an object region;
 a light receiver;
 a scanning unit that includes a plurality of movable mirrors between the light projector and the object region, wherein each of the plurality of movable mirrors is configured to receive reflected reference pulsed light from the object region;
 a condenser lens between the scanning unit and the light receiver, wherein the condenser lens is configured to condense the reflected reference pulsed light received by each of the plurality of movable mirrors;
 a plurality of optical delay adjustment elements, wherein each optical delay adjustment element of the plurality of optical delay adjustment elements corresponds to a respective movable mirror of the plurality of movable mirrors, and
  each optical delay adjustment element of the plurality of optical delay adjustment elements is configured to correct an optical delay between the condenser lens and a light receiving surface of the light receiver;
 a pinhole at a focal position of the condenser lens, wherein
  the pinhole is between the optical delay adjustment element and the light receiver,
  the plurality of optical delay adjustment elements is between the condenser lens and the pinhole,
  the pinhole is configured to reduce light noise,
  the light noise is associated with the reflected reference pulsed light received by each of the plurality of movable mirrors, and
  the light receiver is configured to receive the condensed reflected reference pulsed light as the reflected ref- erence pulsed light from the condenser lens via the plurality of optical delay adjustment elements and the pinhole; and a calculation unit configured to calculate a distance to the object region based on a difference between a light projection timing at which the reference pulsed light is projected and a light receiving timing at which the reflected reference pulsed light is received by the light receiver.

2. The distance measurement apparatus according to claim 1, further comprising:
   a first clock unit configured to measure the light projection timing; and
   a second clock unit configured to measure the light receiving timing.

3. The distance measurement apparatus according to claim 1, wherein
   each of the plurality of movable mirrors is further configured to synchronously perform reciprocating rotational movement around a corresponding rotary axis, and
   the corresponding rotary axis of each of the plurality of movable mirrors is on a same straight line.

4. The distance measurement apparatus according to claim 1, wherein the object region is irradiated with the projected reference pulsed light based on at least one of the plurality of movable mirrors.

5. The distance measurement apparatus according to claim 1, wherein a position of the light receiver is different from the focal position of the condenser lens.

6. The distance measurement apparatus according to claim 5, wherein
   the light receiver includes a plurality of light receiving elements, and
   a light receiving element of the plurality of light receiving elements is configured to:
      receive a plurality of photons at a specific time, and
      respond to one photon of the plurality of photons at the specific time.

7. The distance measurement apparatus according to claim 6, wherein the light receiving element includes a single photon avalanche diode (SPAD).

8. The distance measurement apparatus according to claim 1, wherein
   the plurality of movable mirrors includes a first movable mirror and a second movable mirror,
   the light projector is further configured to irradiate the first movable mirror from the plurality of movable mirrors with the projected reference pulsed light,
   the light receiver is further configured to receive a first light amount of the reflected reference pulsed light via the second movable mirror and a second light amount of the reflected reference pulsed light via the first movable mirror, and
   the first light amount is larger than the second light amount.

9. The distance measurement apparatus according to claim 1, wherein the light receiver corresponds to each of the plurality of movable mirrors.

10. The distance measurement apparatus according to claim 1, further comprising:
    a plurality of connection shafts; and
    a plurality of torsion bars that support the plurality of movable mirrors, wherein each torsion bar of the plurality of torsion bars is connected to the plurality of connection shafts.

11. A vehicle, comprising:
    a distance measurement apparatus that comprises:
       a light projector configured to project reference pulsed light to an object region;
       a light receiver;
       a scanning unit that includes a plurality of movable mirrors between the light projector and the object region, wherein each of the plurality of movable mirrors is configured to receive reflected reference pulsed light from the object region;
       a condenser lens between the scanning unit and the light receiver, wherein the condenser lens is configured to condense the reflected reference pulsed light received by each of the plurality of movable mirrors;
       a plurality of optical delay adjustment elements, wherein
          each optical delay adjustment element of the plurality of optical delay adjustment elements corresponds to a respective movable mirror of the plurality of movable mirrors, and
          each optical delay adjustment element of the plurality of optical delay adjustment elements is configured to correct an optical delay between the condenser lens and a light receiving surface of the light receiver;
       a pinhole at a focal position of the condenser lens, wherein
          the pinhole is between the optical delay adjustment element and the light receiver,
          the plurality of optical delay adjustment elements is between the condenser lens and the pinhole,
          the pinhole is configured to reduce light noise,
          the light noise is associated with the reflected reference pulsed light that is received by each of the plurality of movable mirrors, and
          the light receiver is configured to receive the condensed reflected reference pulsed light as the reflected reference pulsed light from the condenser lens via the plurality of optical delay adjustment elements and the pinhole; and
       a calculation unit configured to calculate a distance to the object region based on a difference between a light projection timing at which the reference pulsed light is projected and a light receiving timing at which the reflected reference pulsed light is received by the light receiver.

* * * * *